(12) United States Patent
Vick et al.

(10) Patent No.: US 11,003,420 B2
(45) Date of Patent: May 11, 2021

(54) SYSTEMS AND METHODS FOR GENERATING ENHANCED DATA METRICS

(71) Applicant: ICE Benchmark Administration Limited, London (GB)

(72) Inventors: Emma Nicolette Vick, Middlesex (GB); Andrew John Hill, Hertfordshire (GB); Gary David Hooper, Kent (GB); Amanda Jane Adams, London (GB); Paul Anderson Rhodes, London (GB); Timothy Joseph Bowler, London (GB); Charles Abboud, London (GB); Stelios Etienne Tselikas, St. Albans (GB); Thomas Evans, Surrey (GB)

(73) Assignee: Ice Benchmark Administration Limited, London (GB)

( * ) Notice: Subject to any disclaimer, the term of this patent is extended or adjusted under 35 U.S.C. 154(b) by 0 days.

(21) Appl. No.: 16/679,835

(22) Filed: Nov. 11, 2019

(65) Prior Publication Data
US 2020/0073631 A1  Mar. 5, 2020

Related U.S. Application Data

(60) Provisional application No. 62/760,096, filed on Nov. 13, 2018.

(51) Int. Cl.
| | |
|---|---|
| *G06F 16/00* | (2019.01) |
| *G06F 7/08* | (2006.01) |
| *G06Q 30/02* | (2012.01) |
| *G06F 16/23* | (2019.01) |
| *G06F 16/22* | (2019.01) |

(52) U.S. Cl.
CPC ............. *G06F 7/08* (2013.01); *G06F 16/22* (2019.01); *G06F 16/2365* (2019.01); *G06Q 30/0201* (2013.01)

(58) Field of Classification Search
CPC ........ G06F 16/22; G06F 16/2365; G06F 7/08; G06Q 30/0201
See application file for complete search history.

(56) References Cited

U.S. PATENT DOCUMENTS

| | | | |
|---|---|---|---|
| 10,474,692 B2 | 11/2019 | Haddad | |
| 2011/0022509 A1* | 1/2011 | Mackey, Jr. | G06Q 40/04 705/37 |
| 2016/0342668 A1* | 11/2016 | Haddad | G06F 16/258 |
| 2018/0011952 A1* | 1/2018 | Murthy | G06Q 10/04 |

* cited by examiner

*Primary Examiner* — Dinku W Gebresenbet
(74) *Attorney, Agent, or Firm* — DLA Piper LLP (US)

(57) ABSTRACT

A system and method for isolating electronic data and generating enhanced data. A data subscription unit receives data having plural data formats from data source devices. The data may be received pre-filtered or filtered by the data subscription unit. A modeling unit may receive the filtered data from the storage databases, may determine eligibility of the stored data based on eligibility criteria, sort the eligible data based on at least one sorting parameter, adjust and/or normalize the eligible data based on at least one adjustment parameter and/or an aggregate value for a data attribute, generate data metrics over a defined set of time periods based on the eligible data, generate further data metrics based on the data metrics, and derive specified values from these metrics. A data distribution device may transmit or make available the data metrics, further data metrics and values to remote devices.

30 Claims, 11 Drawing Sheets

SYSTEMS AND METHODS FOR GENERATING ENHANCED DATA METRICS

TECHNICAL FIELD

The present disclosure generally relates to improving data structure management and, in particular, to data structure management systems and methods for data isolation with improved accuracy for the creation of data metrics.

BACKGROUND

Problems exist in the field of electronic data conversion and distribution. Users of products, systems, processes or instruments which seek to represent, reflect or measure underlying data types/data sets that are complex or are difficult to analyze, or data types/data sets with low (e.g., sparse) or concentrated underlying electronic data, or data types/data sets with underlying data that are difficult to access or analyze, may seek additional information in order to analyze or otherwise utilize these data types/data sets. One use of electronic data (e.g., input data) is in the creation of data metrics (or other statistical analyses/applications) for those data types/data sets that are complex or difficult to analyze, having sparse and/or concentrated underlying electronic data or with underlying data that are difficult to access or analyze. Because the underlying electronic data is sparse/concentrated, or difficult to access or analyze, or because the data types/data sets are complex or difficult to analyze, it may be difficult to isolate and analyze the correct underlying data, and to generate accurate data metrics.

In the absence of sufficient data and information, and the correct analysis and processing, conventional metrics (based on the sparse/concentrated data and information) are often inaccurate and unreliable, or no appropriate or pertinent conventional metric may exist. Accordingly, there is a need for improved data conversion and distribution systems which are able to isolate correct data and generate accurate and pertinent metrics, even if the underlying data being used is sparse and/or concentrated, or difficult to access or analyze, or if the data types/data sets being measured are complex or are difficult to analyze.

SUMMARY

A system and method for isolating electronic data and generating enhanced data is disclosed. A data subscription unit may receive data having a plurality of data formats from data source devices. In an example, the data may be filtered by one or more among the data source devices. In another example, the data subscription unit may filter the received data based on filter criteria. In another example at least a portion of the data may be filtered by one or more among the data sources and another portion of the data may be filtered by the data subscription unit based on the filter criteria. The data subscription unit may transmit the filtered data to storage databases. A modeling unit may receive the filtered data from the storage databases, determine eligibility of the stored data based on eligibility criteria, sort the eligible data based on at least one sorting parameter, and/or adjust the eligible data based on at least one adjustment parameter, generate data metrics over a defined set of time periods based on the eligible sorted and adjusted data, generate further data metrics based on the data metrics, and and/or derive specified values from among the data metrics and the further data metrics. A data distribution device may transmit or make available the data metrics, the further data metrics and values to remote devices.

DETAILED DESCRIPTION

Figure 1:
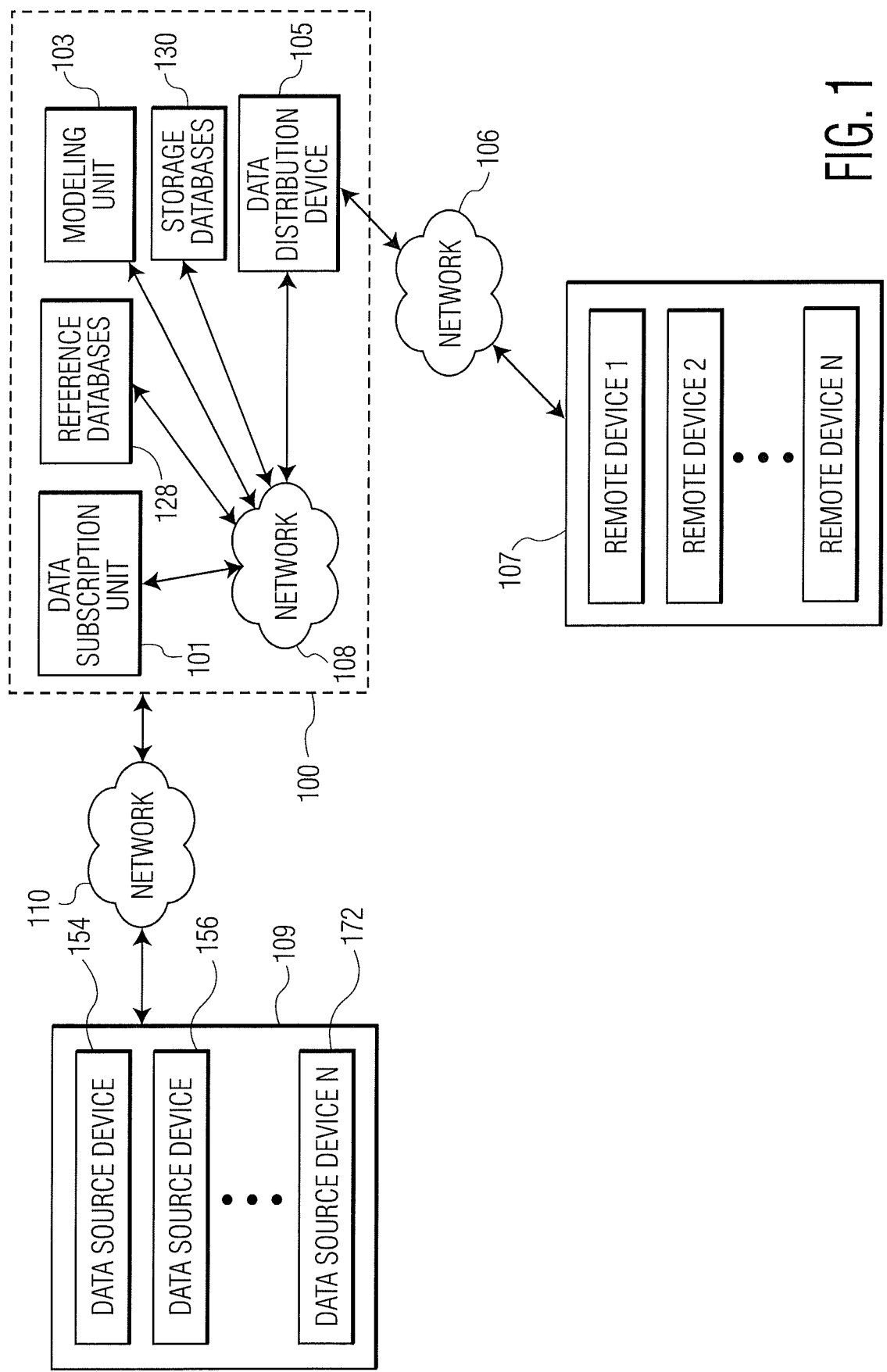
FIG. 1 is a functional block diagram of an example data structure management system for data isolation and generation of improved data metrics ("enhanced data") according to the present disclosure.

Aspects of the present disclosure relate to systems, methods and non-transitory computer-readable storage media for data isolation and the creation of data metrics such as a credit spread yield curve, a term risk free rate yield curve, a bank yield curve, a bank yield index (BYI), etc.

An example data structure management system according to the present disclosure may include at least one data subscription unit and at least one modeling unit. The data subscription unit may have at least one data interface communicatively coupled to a plurality of data source devices and may be configured to receive or pull data having a plurality of data formats from the plurality of different data source devices during one or more particular time periods (e.g., one or more days in a pre-defined collection period). In an example, the data having a plurality of data formats may be filtered by one or more among the plurality of different data sources prior to transmission to the data subscription unit. In another example, the data subscription unit may be configured to filter the data upon receipt. In yet another example, a portion of the data may be filtered by at least one of the data sources and the same or another portion may be filtered or further filtered by the data subscription unit. The data having a plurality of data formats may be filtered based on predefined parameters or criteria (e.g., transaction and/or value date, transaction and/or contract type, etc.). The data subscription unit may transmit the data to one or more storage databases via secure communication channel(s) over a network. The modeling unit of the data structure management system may include one or more servers, a non-transitory memory, and one or more processors including machine readable instructions. The modeling unit may be communicatively coupled to the data subscription unit. The modeling unit may also include a data receiver module, a data verifier, a data sorting module, a data adjustment module, a data processing module, and/or a data transmission module. The data receiver module of the modeling unit may be configured to receive filtered data from the one or more storage databases via the secure communication channel(s) over the network. The data verifier of the modeling unit may be configured to apply one or more eligibility criteria to the filtered data. The data sorting module may be configured to sort the eligible data into one or more groups (e.g., by transaction date, value data, and/or tenor) based on one or more parameters. The eligible sorted data may be adjusted by the data adjustment module to reflect, for example, changes in market rates over relevant dates and/or to convert between different price/yield quotation conventions.

The data processing module may use the eligible sorted and possibly adjusted data to generate accurate data metrics. In one example, the data metrics may comprise a bank yield curve over a defined set of time periods (e.g., a bank yield curve over maturities up to one year) and one or more forward-looking term rates may be determined from the bank yield curve. This bank yield curve may be constructed directly based on bank funding and bond transaction data. In another example, the data metrics may comprise a term nearly risk-free rate curve constructed from risk free rate and derivatives data and a bank credit spread yield curve constructed from bank funding and bond transaction data and the risk-free rate yield curve, which may be combined to produce a bank yield curve over a defined set of time periods. The data transmission module may be configured to transmit the metrics, which may include one or more of a bank yield curve, a bank credit spread yield curve and a term nearly risk-free rate curve, and one or more values (e.g., forward-looking term rates in the case of a BYI, etc.) determined from these metrics to a data distribution device via one or more secure communication channels over a network. It should be noted that the term "risk-free" may be used for the term "nearly risk-free," and vice versa, in the following description.

The data distribution device may further include a non-transitory memory and at least one data distribution interface. The non-transitory memory may be configured to store the data metrics (e.g., at least one of the bank yield curve, a bank credit spread yield curve, and a term nearly risk-free rate curve, and the one or more values or rates, such as the BYI, determined from these metrics). One or more of the data distribution interfaces may be configured to provide secure communications with at least one of one or more remote devices.

A remote device may include a non-transitory memory, one or more processors including machine readable instructions, a data distribution receiver interface communicatively coupled to the data distribution device, a user information interface, a market data source interface, and/or a user display interface. One or more of the remote devices may be further configured to receive the data metrics from the data distribution device via the data distribution receiver interface, receive user input data via the user information interface, generate supplementary projected data via one or more processors, and/or display at least a portion of the projected data and the supplementary projected data on a user display interface. The supplementary projected data may be based on the data metrics' sensitivities, projected data, user input data, and/or current external (e.g., market) data.

Referring now to FIG. 1, a functional block diagram of an example data structure management system 100 for data isolation and generation of improved data metrics ("enhanced data") according to the present disclosure is shown. The data structure management system 100 may include a data subscription unit 101, a modeling unit 103, and a data distribution device 105. The data subscription unit 101, the modeling unit 103 and the data distribution device 105 may be communicatively coupled via a network 108. Alternatively or additionally, the data subscription unit 101 may be directly coupled to the modeling unit 103, and/or the modeling unit 103 may be directly coupled to the data distribution device 105, without the use of a network.

The data structure management system 100 may be communicatively coupled to one or more remote devices 107 via a network 106. In one example, each of the remote devices 107 may be used by participants including for example, data managers, data analysts, regulatory compliance teams, and the like. In an example, the data structure management system 100 may include a surveillance module (not shown) for supervision and/or surveillance of the modeling unit 103. The surveillance may be performed post-publication (e.g., after the data metrics are distributed to the one or more remote devices 107) to verify input data is correct and/or to check for potential manipulation of the input data. Although the data structure management system 100 is described in some examples below with respect to data classes associated with electronic instrument data, the data structure management system 100 may be used with any electronic data classes associated with any type of electronic data, including those having sparse data. Some non-limiting examples include traffic pattern data, population distribution data, galactic activity data, etc.

The data subscription unit 101 may have at least one data interface communicatively coupled to one or more data source devices 109. Although the description and drawings herein describe the data conversion and distribution system 100 and its surrounding environment as having one or more data source devices 109 and one or more remote devices 107, in some examples, there may be any combination of data source devices 109 and/or remote devices 107, including for example, a single data source device 109 and a single remote device 107, or a single data source device 109 and no remote devices 107. One or more of the one or more data source devices 109, data subscription unit 101, modeling unit 103, data distribution device 105, and one or more remote devices 107 may include one or more computing devices including a non-transitory memory component storing computer-readable instructions executable by a processing device to perform the functions described herein.

The one or more data source devices 109 may be communicatively coupled to the data subscription unit 101 via a network 110. The data distribution device 105 may be communicatively coupled to the one or more remote devices 107 via the network 106. The networks 110 and 106 may include two or more separate networks to provide additional security to the one or more remote devices 107 by preventing direct communication between the one or more remote devices 107 and the one or more data source devices 109. Alternatively, the networks 110, 106 may be linked and/or a single large network. The networks 110, 106 (as well as network 108) may include, for example, a private network (e.g., a local area network (LAN), a wide area network (WAN), intranet, etc.) and/or a public network (e.g., the internet). The networks 110 and/or 106 may be separate from or connected to network 108.

In an example implementation, the one or more data source devices 109 may include data sources 154-172. It should be noted that only data sources 154, 156 and 172 are shown in FIG. 1 for illustrative purposes. A first data source data source 154 may include bank funding transaction data received from submitting banks, for example, through secure file transfer, or from another appropriate data source. A second data source 156 may include one or more suitable data providers of information regarding one or more business day calendars (e.g., a business day calendar for the United States, a business day calendar for the United Kingdom, etc.). A third data source 158 (not shown) may include one or more suitable data providers of one or more reference rates. A fourth data source 160 (not shown) may include one or more suitable data providers of bond transaction data. In some examples, the fourth data source 160 (not shown) may include one or more trade repositories, one or more trading venues, other suitable trade reporting service(s) and/or platform(s). A fifth data source 162 (not shown) may include one or more suitable data providers of additional transaction data that may be relevant to bank yields such as, without being limited to, certificates of deposit (CD), commercial paper (CP) data, etc. In some examples, the fifth data source 162 (not shown) may include one or more trade repositories, one or more trading venues, other trade reporting service(s) and/or platform(s). A sixth data source 164 (not shown) may include one or more suitable data providers of other (e.g., additional) market data appropriate to processing input, rate and yield data (e.g., that may be relevant to processing input, rate and yield data). A seventh data source 166 (not shown) may include one or more data providers of suitable eligibility criteria appropriate to filtering reference rate, contract, transaction, yield and other appropriate input data. An eighth data source 168 (not shown) may include one or more suitable data providers of data from derivative transactions referencing nearly risk-free reference rates. In some examples, a ninth data source 170 may include one or more trade repositories, one or more trading venues, other trade reporting service(s) and/or platform(s). A tenth data source 172 may include one or more suitable data providers of information regarding expected policy rate change dates (e.g., a calendar of expected rate change dates for the United States, the United Kingdom, etc.). Notably, more or fewer data sources, or a combination of different types of data sources, may comprise the data structure management system 100 of the present disclosure.

The data structure management system 100 may include one or more reference databases 128 and one or more storage databases 130. The one or more reference databases 128 may store transaction, contract, rate and other input data eligibility criteria for the one or more data source devices 109 (e.g., in respect of bond transaction data, a bond identifier, transaction type, size, time window of execution, etc.) to assist the modeling unit 103 in processing/filtering data as described below. The one or more storage databases 130 may store transaction and other input data gathered by the data subscription unit 101, as described below.

In an example, the data structure management system 100 may perform one or more of the above processes automatically. In another example, the data management system 100 may include a surveillance module (not shown), which may be referred to as an administration/surveillance module (not shown). The administration/surveillance module may be configured to receive one or more inputs. The surveillance module may allow supervision, administration, and/or surveillance of the data collection, filtration/eligibility criteria application, modelling, calculation and publication process performed by the modeling unit 103. It should be noted that this administration and/or surveillance may occur contemporaneously with the data collection, processing, calculation and/or post-publication.

Figure 2:
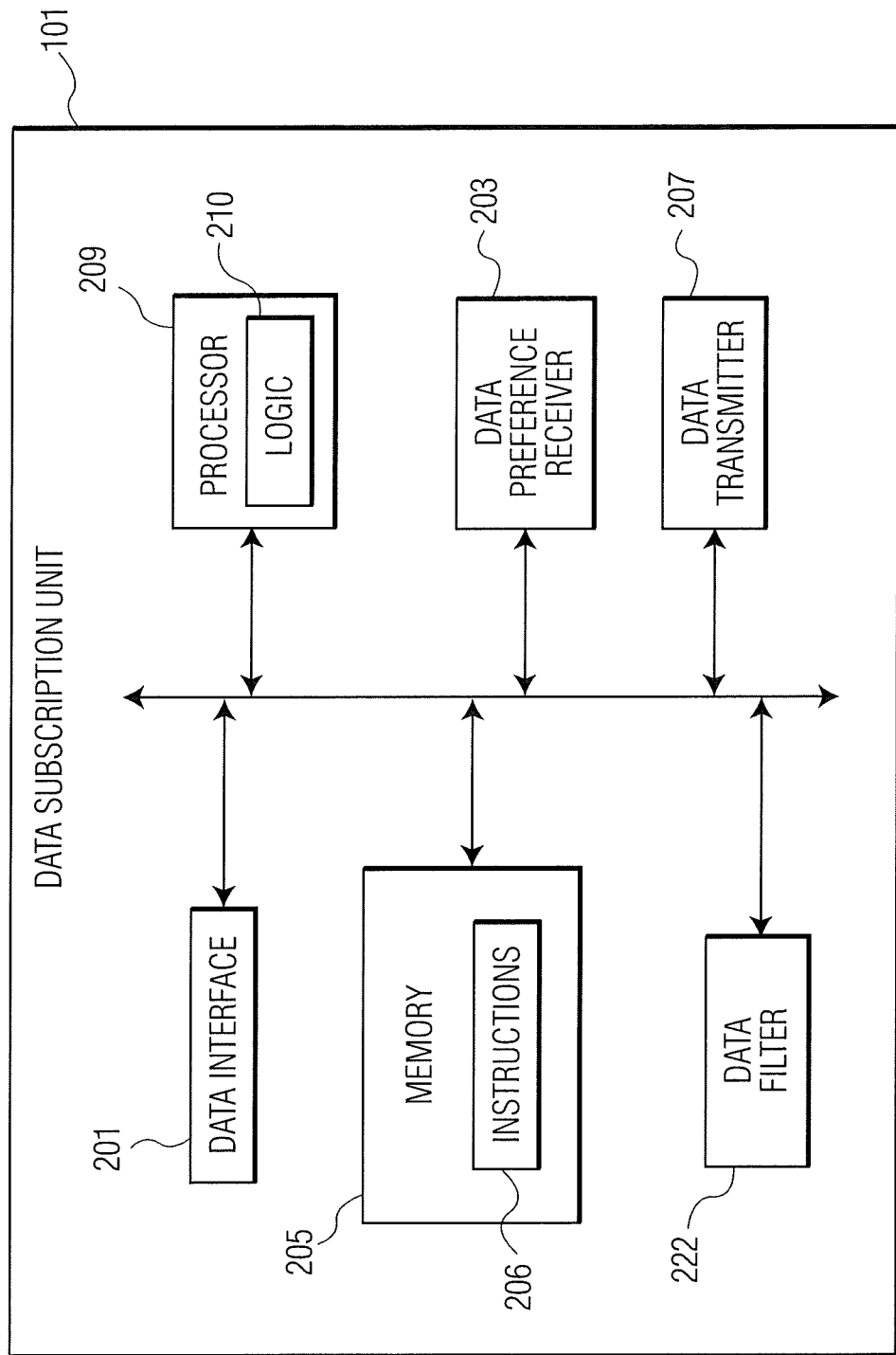
FIG. 2 is a functional block diagram of an example data subscription unit according to the present disclosure.

Referring now to FIG. 2, a functional block diagram of the exemplary data subscription unit 101 is shown. The data subscription unit 101 may include at least one data interface 201 communicatively coupled via network 110 to the one or more data source devices 109. The data subscription unit 101 may be configured to receive data having a plurality of data formats (e.g., via the electronic data files, via direct data feeds, etc.) produced by the one or more data source devices 109. The data subscription unit 101 may include one or more processors 209 (also referred to herein as processing component 209), logic 210 and a non-transitory memory 205 including instructions 206 and space to store subscription preferences. The subscription preferences may define the parameters of the communicative coupling between the data subscription unit 101 and the one or more data source devices 109. In other words, the subscription preferences may define which of the one or more data source devices 109 to connect to and communicate with, the type, volume and/or frequency with which data is pulled or received from said data source devices 109, and/or any other parameters related to the flow of data and information. The data subscription unit 101 may also include a data transmitter 207 configured to transmit the received data (having the plurality of data formats) via secure communication channel(s) over the network 108. Transmissions from the data transmitter 207 may be stored in the one or more storage databases 130, where it may be accessed by the modeling unit 103 of the data structure management system 100.

The data subscription unit 101 may, for example, via processor 209, receive subscription preferences, store the received subscription preferences in the non-transitory memory 205, and communicatively couple via the at least one data interface 201 of the data subscription unit 101 to the one or more data source devices 109. Communicatively coupling via the at least one data interface 201 of the data subscription unit 101 to the one or more data source devices 109 may further include sending a request (from the data subscription unit 101) to the one or more data source devices 109 to receive data (e.g., files, feeds, etc.) related to a particular input or data, over a particular communication link, at a specified frequency. The data subscription unit 101 may then connect to the one or more data source devices 109 by establishing a communication link between the data interface 201 of the data subscription unit 101 and the one or more data source devices 109 via the network 110. The network 110 may be unsecured or secured and wired and/or wireless.

The data subscription unit 101 may be subscribed to the one or more data source devices 109 if a request transmitted to at least one data source (e.g., data sources 154-172) is accepted and data and information is transmitted in accordance with the request from the at least one data source (154-172) to the data subscription unit 101 via the network 110. A request may specify the type and/or volume of data and information requested, the frequency at which it should be transmitted, as well as the communication protocol that should be used to transmit the data and information. For example, a request may be that the one or more data source devices 109 transmit electronic data files regarding all trading activity relating to an instrument or a product at the end of every business day in a data collection period in accordance with a file transfer protocol (FTP) or secure file transfer protocol (SFTP). Alternative secure communication channels or links may be utilized.

In accordance with the received request, the respective one or more data source devices 109 may generate and/or transmit one or more electronic data files containing the requested information (or transmit directly via data feed(s)) at the specified frequency. The information and data may then be received by the data subscription unit 101 via data interface 201. In this manner, the data structure management system 100 may dictate receiving only the type and volume of data and information that is pertinent to supplementing and/or generating statistical information (e.g., data projections and sensitivities) related to one or more electronic data classes for which directly-related or historical information is sparse or unavailable. As a result, the processing and memory requirements of the data structure management system 100 are minimized and system efficiency is maximized (i.e., by avoiding receiving irrelevant or voluminous data beyond what is needed or desired), particularly in implementations where large volumes of data (e.g., millions of data requests and/or data points) may be received in a given period of time (e.g., per day).

The electronic data and information received via the at least one data interface 201 of the data subscription unit 101 may be in a variety of formats. For example, the data file formats may correspond to the specifications of each of the one or more data source devices 109 from which the data and information are received. Additionally, the data formats may have different data transfer parameters, compression schemes, and the like. Furthermore, in some examples, the data content may correspond to different forms of data, such as different currencies, date formats, time periods, and the like. The data interface 201 may receive a separate electronic data feed or file for each request for information. For example, the data interface 201 may receive a single data file or data packet, corresponding to one or more requests for information, from each of the one or more of the data source devices 109 to which it subscribes.

The frequency and volume of data which is provided to the data subscription unit 101 and the setup for a communication link may be arranged in accordance with the subscription preferences stored on the data subscription unit 101. The subscription preferences may be provided by a user device (not shown) in communication with the data structure management system 100 (either via a direct and/or remote connection to data subscription unit 101, or by way of any other input means of the data structure management system 100) and/or remotely by a remote device 107 communicating with the data structure management system 100. The preferences may be stored on the non-transitory memory 205 of the data subscription unit 101. Optionally, the data received via the data interface 201 may also be stored in the non-transitory memory 205 of the data subscription unit 101. Newly received data from the one or more data source devices 109 may be used to update, add to, or remove data already stored in the non-transitory memory 205 of the data subscription unit 101.

The subscription preferences may be received by a data subscription preference receiver 203 specially configured to receive subscription preference data, and store and/or update subscription preferences in at least a portion of the non-transitory memory component 205 of the data subscription unit 101.

After the one or more data source devices 109 are subscribed to by the data subscription unit 101, the data may be automatically transmitted from the one or more data source devices 109 to the data subscription unit 101 as noted above. A predetermined event or time (e.g., the close of a business day, a weather event, a predetermined time of day, etc.) may cause the one or more data source devices 109 to automatically generate the data and/or information for the data subscription unit 101.

In an example, the data having a plurality of data formats may be filtered by one or more among the one or more data source devices 109 prior to transmission to the data subscription unit 101. In another example, the data subscription unit 101 may include a data filtering module 222. In yet another example, a portion of the data may be "pre-filtered" by data source device(s) 109 and another portion may be filtered by data filtering module 222. In yet another example, data filtering module 222 may perform additional filtering on at least a portion of the pre-filtered data. The data filtering module 222 may filter the data according to one or more criteria. In one example, the data may be filtered by one or more submission/publication days. The data filtering module 222 may define an input data time window (e.g., midnight New York time on the second preceding day to midnight New York time on the preceding day for each day within a designated collection period) during which the data from the one or more data sources 109 is to be collected.

The data subscription unit 101 may further include one or more security protocols. The security protocols may include, for example, verification of one or more unique identifiers associated with the received electronic data/information, including, for example the unique data file identifier and/or a unique data source identifier. For example, the unique data source identifier may be utilized by the data subscription unit 101 to verify that it is receiving data and/or information from the appropriate one or more data source devices 109. Such a system may be advantageous in preventing denial of service attacks and other malicious actions which are intended to harm the data structure management system 100 or the remote device(s) 107 (e.g., by way of the data structure management system 100).

Figure 3:
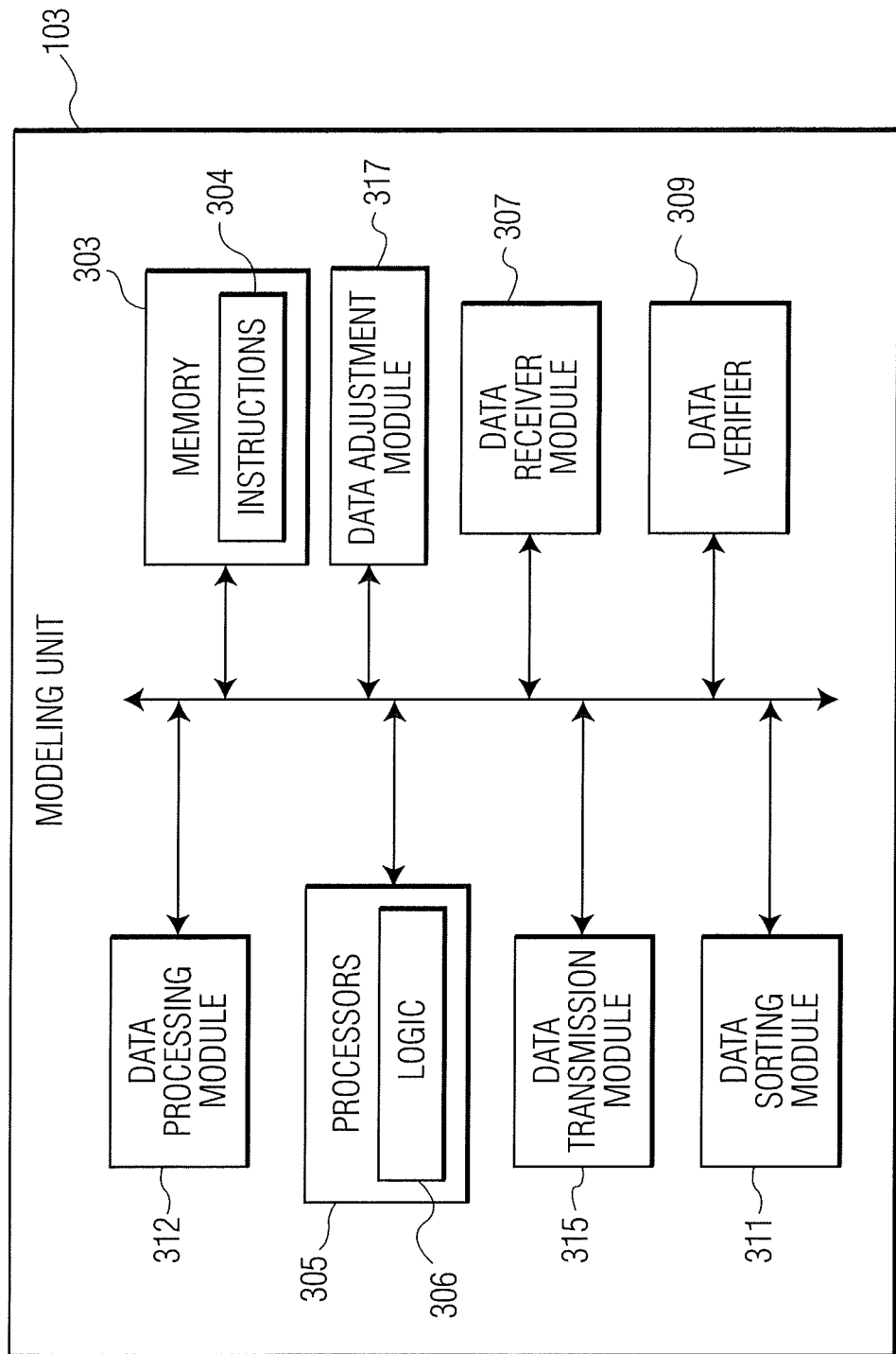
FIG. 3 is a functional block diagram of an example modeling unit according to the present disclosure.

Referring now to FIG. 3, a functional block diagram of the modeling unit 103 is shown. The modeling unit 103 may include a non-transitory memory 303 storing machine readable instructions 304, and one or more processors 305 (also referred to herein as processing component 305) including processor logic 306. The modeling unit 103 may be communicatively coupled to the reference database(s) 128 and/or the storage database(s) 130. The modeling unit 103 may also include a data receiver module 307, a data verifier 309, a data sorting module 311, a data processing module 312, a data adjustment module 317, and/or a data transmission module 315. Although the modeling unit 103 is illustrated in FIG. 1 as a single machine (e.g., a server), in some examples, the modeling unit 103 may include one or more servers, directly connected in a single location and/or networked across multiple locations.

The data receiver module 307 may be configured to receive electronic data having the plurality of data formats from the one or more reference databases 128 and/or the one or more storage databases 130 via an optionally secure communication channel over the network 108. For example, the data receiver module 307 may retrieve the filtered data stored in the one or more storage databases 130 by the data subscription unit 101. The data receiver module 307 may retrieve one or more eligibility criteria stored in the one or more reference databases 128. Once the data receiver module 307 receives the data having the plurality of data formats, it may transfer the data from the data receiver module 307 to the data verifier 309.

The data verifier 309 may be configured to monitor the one or more data source devices 109 for new and/or eligible data and to verify incoming data from among the data sources 154-172. The verification may include comparing the incoming data to one or more eligibility criteria stored in the one or more reference databases 128 and performing other verification checks (e.g., for errors). The eligibility criteria retrieved from the one or more reference databases 128 may be associated with a particular data source. The data verifier 122 may add/remove eligibility criteria from the one or more reference databases 128. The addition/removal of eligibility criteria from the one or more reference databases 128 may be based on data received from the one or more data source devices 109. The data verifier 309 may proactively pull data from the data sources 154-172. Alternatively, data from the data sources 154-172 may be pushed to the data verifier 309 at one or more times (e.g., periodically, under particular conditions, etc.).

The data verifier 309 may apply one or more eligibility criteria to, for example, the first data source 154, such as, without being limited to, a window of execution, a transaction size, a transaction type, etc. The data verifier 309 may apply one or more eligibility criteria to, for example, bond transaction data of the fourth data source 160, such as, without being limited to, a bond identifier based on issuer, issuer information, bond characteristics and/or transaction characteristics. The data verifier 309 may apply one or more eligibility criteria to, for example, the fifth data source 162, such as, without being limited to, a window of execution, a transaction size and/or a transaction type. It should be noted that the one or more eligibility criteria described above, as well as others, may be applied to any data from one or more of the data sources 154-172 (including, without being limited to, data from derivatives referencing risk free rates, risk free rate information, etc., as discussed above).

The data verifier 309 may verify whether some or all of the submitted data from the one or more data source devices 109 meets the eligibility criteria upon submission to the data structure management system 100, and may perform other verification checks (e.g., for errors). In some examples, the data verifier 309 may verify the data provided by the one or more data source devices 109 to obtain an eligible data set. When the submitted data meets the eligibility criteria, the data verifier 309 may permit the data to be processed by the data structure management system 100. When the submitted data does not meet the eligibility criteria, in some examples, the data verifier 309 may permit the data to be discarded by data structure management system 100. In some examples, the eligibility criteria for the one or more data source devices 109 may be determined by pre-determined and stored administrator rules of the data structure management system 100.

After checking against eligibility criteria, the data may be sorted by the sorting module 311. The sorting module 311 may group the eligible data into one or more groups. In one exemplary implementation, the groups for transaction data may be tenor groups, although other implementations may define other groups according to the type of data and/or industry in which the system of the present disclosure is being implemented. In this example, the sorting into the one or more tenor groups may be based on one or more factors, such as (for example) days to maturity as of the transaction execution date or the transaction effective date. The number of the one or more tenor groups and the factors used for sorting may be predetermined, for example, automatically or by predetermined (stored) administrator rules of the data structure management system 100.

The eligible, sorted data may be adjusted by a data adjustment module 317 to reflect, for example, changes in market rates over relevant dates and/or to convert between different price/yield quotation conventions. Each of the one or more tenor groups in this example may have an associated minimum number and/or volume of data points. For example, a tenor group may be classified by the sorting module 311 to store a number of transactions within a particular data collection period. If this tenor group has fewer than a minimum number of transactions for the data collection period, additional transaction data from previous days may be added to the tenor group by the data verification module 309 or the data sorting module 311. In an example, the data verification module 309 or the data sorting module 311 may "de-duplicate" the received data if the data sources 154-172 include multiple reports for the same transaction (e.g., from buyer, seller, and/or dealer) with the same or slightly different details between reports.

In another example, if a minimum aggregate volume or transaction count threshold is not reached over the course of the entire data collection period (i.e. for all tenors), then additional transaction data from previous days may be added to the eligible set of transactions by the data verification module 309 or the data sorting module 311. The previous days' transaction data may be adjusted using appropriate reference rate data (e.g., term nearly risk-free reference rates) over the same period, or other market data.

Continuing with these examples, if any of the tenor groups or all the tenor groups together still has insufficient eligible transaction data (e.g., transaction count or transaction volume) after applying the above look-back protocol, a contingency policy may be applied by the data processing module 312. In addition, the data adjustment module 317 may apply a customized levelling/weighting methodology when it is determined that the data includes an excess of input data from a particular source or of a particular type (e.g., from the same issuer).

The data processing module 312 may derive data metrics (e.g., a bank yield curve, credit spread curve, or term nearly risk-free rate curve) from eligible data points, for example, using a best-fit methodology (e.g., robust regression) or an implied term-rate generation methodology (e.g. a step-function and compounding). In one example, credit spread values for each eligible transaction may be derived from subtracting values on a term nearly risk-free rate curve from transaction yield data points and fitted to generate a credit spread curve. The data processing module 312 may further combine data metrics (e.g., a term nearly risk-free rate curve and a credit spread curve) to generate a bank yield curve. Specific values may be produced from these metrics (e.g., one or more term rates derived from the bank yield curve at given maturities, such as a BYI). In some examples, other relevant input data, including business day calendar data, expected rate change date data, and reference rate data may be utilized at one or more steps of the processing of the input data.

The output from the data processing module 312 may be transmitted via the data transmission module 315 to the data distribution device 105 via one or more secure communications over network 108.

Figure 4:
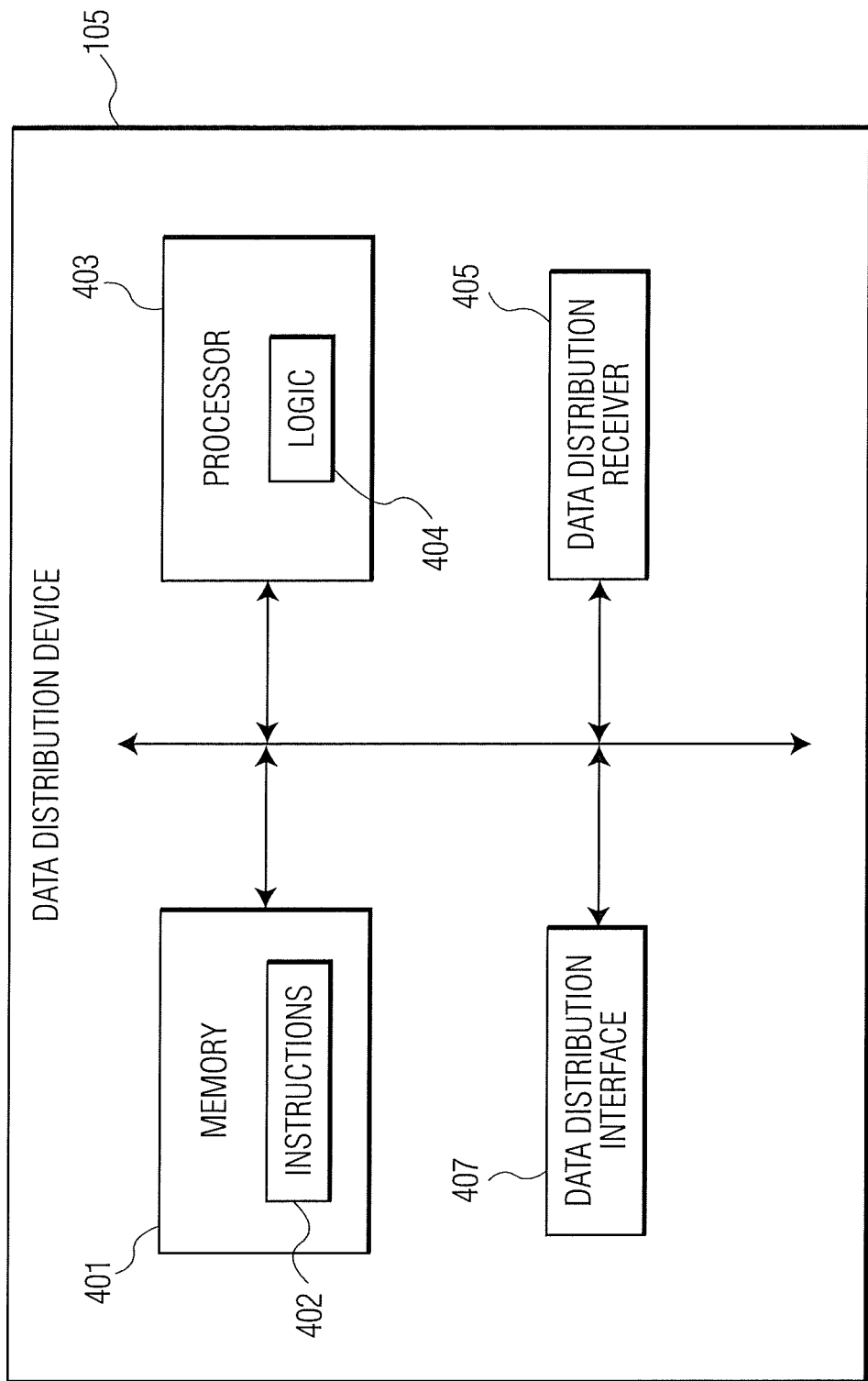
FIG. 4 is a functional block diagram of an example data distribution device according to the present disclosure.

Referring now to FIG. 4, a functional block diagram of the exemplary data distribution device 105 of this disclosure is shown. The data distribution device 105 may include one or more processors 403 (also referred to herein as processing component 403) including processor logic 404. The data distribution device 105 may include at least one data distribution receiver 405 configured to receive information from the modeling unit 103. The data distribution device 105 may include non-transitory memory 401 including instructions 402 to store the outputs from the data processing module 312.

The data distribution device 105 may include at least one data distribution interface 407 configured to securely communicate with the one or more remote devices 107 via the network 106. The non-transitory memory 401 of the data distribution device 105 may also be configured to store predefined settings for the one or more remote devices 107. In an example, the data distribution device 105 may transmit the data output from the data processing module 312 to the one or more remote devices 107 via email. In another example, the data distribution device 105 may publish the data on a website via a server, etc. In yet another example the data distribution device 105 may transmit the data to one or more redistributors (e.g., Bloomberg, Refinitiv, etc.).

Figure 5:
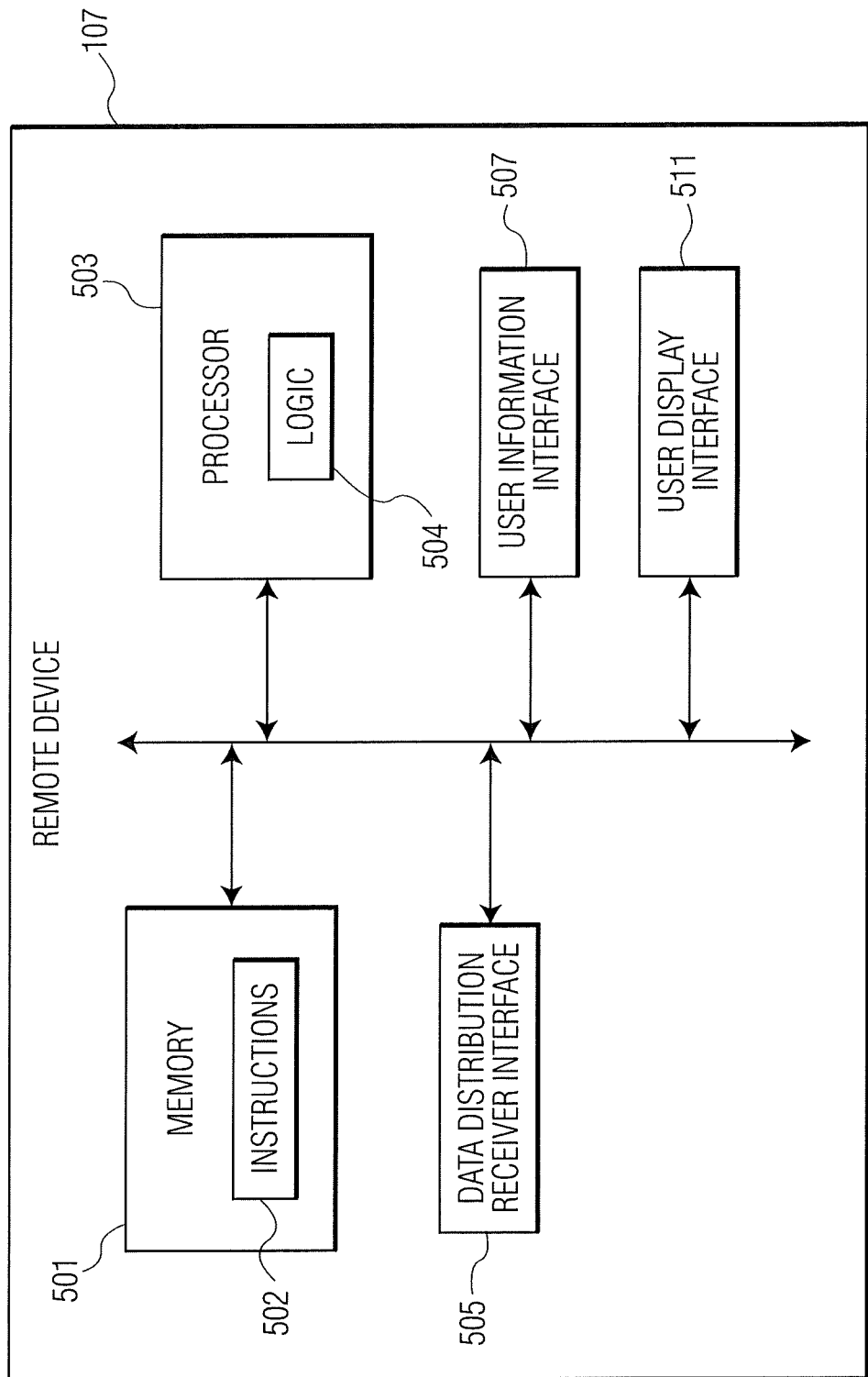
FIG. 5 is a functional block diagram of one or more example remote devices according to the present disclosure.

Referring now to FIG. 5, a functional block diagram of the one or more exemplary remote devices 107 of the present disclosure is shown. The one or more remote devices 107 may include a non-transitory memory 501 storing machine readable instructions 502, one or more processors 503 (also referred to herein as processing component 503) including processor logic 504, a data distribution receiver interface 505, a user information interface 507, and a user display interface 511. It should be noted that the one or more remote devices 107 may include one or more servers and the user information interface 507 and the user display interface 511 may be optional.

The data distribution receiver interface 505 may be specially configured to be communicatively coupled to the data distribution device 105 via network 106. For example, the remote device 107 may be specially configured to perform certain data processes, contain an up-to-date version of a web browser associated with the data structure management system 100, and have an Internet connection capable of communication with the data structure management system 100. The remote device 107 may have an account with the service provider of the data structure management system 100. The remote device 107, and, more specifically the data distribution receiver interface 505, may establish a secure connection with the data distribution device 105. The secure connection may be mediated by a password portal on a web-service, a secured application, biometrics device(s), and the like. Additional security measures which allow for encrypted communications (such as industry standard secured hypertext transfer protocol (HTTPS), secure socket layer (SSL) certificates, and the like) may also be used. Although a single remote device 107 is discussed, a plurality of remote devices 107 may be used with the data structure management system 100.

Each remote device 107 may be configured to receive, via the data distribution receiver interface 505, enhanced data and information. In an example, this enhanced data and information may comprise data metrics such as at least one of the yield curve metrics, such as the one or more values determined from the yield curve from the data distribution device 105. The remote device 107 may also be configured to receive user input data via the user information interface 507. In one example, the remote device 107 may also be configured to generate supplementary projected data based on at least one of the yield curve and the one or more values determined from the yield curve.

The processing component 503 of each of the remote devices 107 and the processing component 403 of the data distribution device 105 may work in unison to assist the data processing module 312 generate supplemental projected data. The data distribution device 105 may receive and store data from the remote device 107. The stored data from the remote device 107 may be accessed by the data processing module 312, which may then generate the supplemental projected data. The supplemental projected data may then be transmitted from the modeling unit 103 to the data distribution device 105, as described above, and then to the remote device 107. The remote device 107 may receive and/or store the supplementary projected data from the data distribution device 105.

The remote devices 107 may also display the enhanced data (e.g., at least one of the yield curves and the one or more values determined from the yield curves) via user display interface 511. The user display interface 511 may further include a graphical user interface (GUI), application programming interface (API) and the like. The remote device 107 may be configured to receive user graphical user interface (GUI) preference data via interface 507. Using the received user GUI preference data, the remote device 107 may extract information including (in an example referenced above) the yield curves and the one or more values determined from the yield curves from the memory 501 of the remote device 107 and/or memory 401 of the data distribution device 105. The extracted information may then be displayed on the graphical user interface of the user display interface 511 in accordance with the user GUI preference data.

Figure 6:
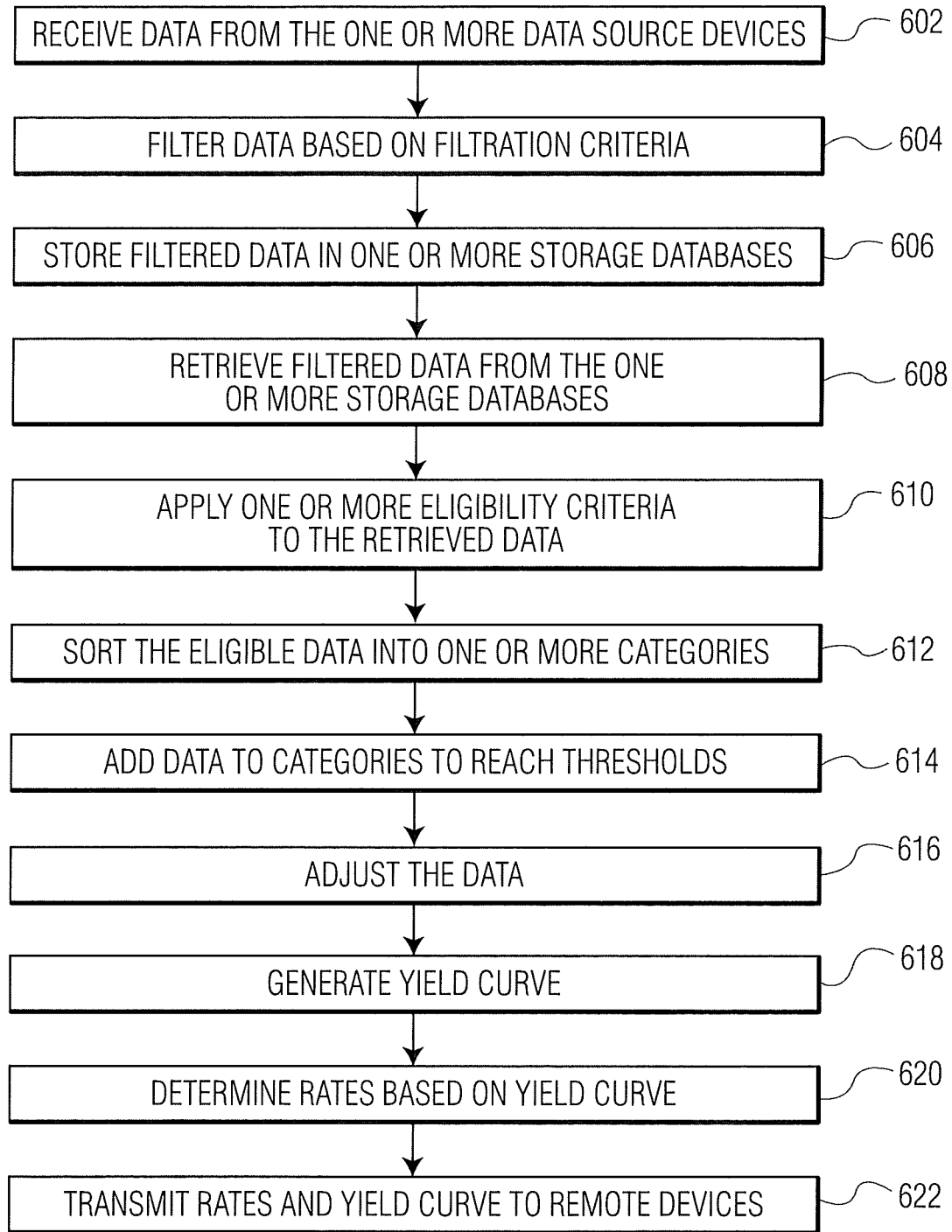
FIG. 6 is a flowchart illustrating an exemplary process for generating a yield curve using the data structure management system of the present disclosure.

Referring now to FIG. 6, a flowchart illustrating an exemplary process generating a yield curve using the data structure management system 100 is shown. The data processing module 312 may generate a yield curve and values for one or more periods of time from the data received from the data sorting module 311, as discussed above. The one or more periods of time may correspond to the one or more of the tenor groups created by the sorting module 311. Based on transactional and other data received from the from one or more of the data source devices 109, the yield curve may be generated by the data processing module 312 and distributed by the data distribution device 105 at a predetermined frequency (e.g., daily).

Beginning with Step 602, the data subscription unit 101 may receive data from the one or more data source devices 109. The data may include, at least, wholesale primary market funding transaction data and secondary market bond transaction data. The wholesale primary market funding transaction data may be received from, at least, the first data source 154, and may include inter-bank deposits, institutional certificates of deposit, and/or commercial paper. In an example, the wholesale primary market funding transaction data may be received daily from one or more large internationally active bank systems. The secondary market bond transaction data may be received from, at least, the fourth data source 160. In an example, the secondary market bond data may be received in respect of one or more large internationally active bank system issuers. The bank systems may be selected by, for example, pre-determined administrator rules of the data structure management system 100 or automatically according to programmed logic.

The bank systems may be subject to one or more minimum criteria, such as (without limit): consolidated group assets greater than USD $250M or its equivalent in other currencies; investment grade credit ratings at a group parent level or at the level of the largest banking (operating company) subsidiary where the parent does not have credit ratings, etc. The ratings may be provided by at least two credit rating agencies' systems that are used in US, European, and/or Asian debt capital and loan markets. Other relevant factors when selecting internationally active bank systems may include: a bank's current or historical participation at the group parent level or by one of its subsidiaries as a submitter/contributor to one of certain interbank offered rates (e.g., LIBOR, EURIBOR, etc.); the formation of an intermediate holding company in the United States as a result of having greater than USD $50B in assets in the United States; the bank's presence in wholesale USD capital, loan or money markets; and any other factors that the data structure management system 100 may deem relevant (according to pre-determined rules) over time to ensure the banking index remains representative of the economic reality it seeks to measure.

At Step 604, the data subscription unit 101 may filter the transactional input data based on, for example, an input data time window (e.g., midnight New York time on the second preceding day to midnight New York time on the preceding day for each day within a designated collection period) during which the data from the one or more data sources 109 is to be collected. As described above, this step may be optional, in some examples, if the one or more data source devices 109 filter the data prior to transmission to the data subscription unit. In Step 606, the data subscription unit 101 may store the filtered data in the one or more storage databases 130.

Next, at Step 608, the modeling unit 103 may retrieve the filtered data from the one or more storage databases 130. In Step 610, the modeling unit may apply one or more eligibility criteria, stored in the one or more reference databases 128, to the filtered data.

In an example, the criteria for eligible wholesale primary market funding transaction data may include a minimum funding transaction size of at least USD $10M and certain specified transaction types and maturities. These criteria may be assessed to determine whether the funding transactions are eligible for use by the data processing unit 312. Table 1 shows example eligibility criteria for wholesale primary market funding transaction data.

TABLE 1

Example Primary Market Funding Transaction Eligibility Criteria

| Category | Criteria |
| --- | --- |
| Transaction Provider | Confirmed Eligible Provider |
| Transaction Currency | USD |
| Transaction Size | ≥USD $10M |
| Transaction Type | Unsecured term deposits, commercial paper (fixed rate and primary issuance), certificates of deposit (fixed rate and primary issuance) |
| Counterparty Type | Banks; Central banks; Governmental entities; Multilateral development banks; Non-bank financial institutions; Sovereign wealth funds; Supranationals; and Corporations (for transaction maturities >35 days). |
| Days to Maturity of Transaction | ≥5 business days and ≤500 calendar days |

The secondary market bond transaction data may include secondary market transactions in wholesale unsecured bonds. More specifically, the secondary market bond transaction data may include yields for eligible secondary market transactions in eligible senior unsecured fixed rate USD-denominated wholesale bonds issued by internationally active banks. The secondary market bond transaction data may be issued by one or more (e.g., 30) large internationally active banking groups. In an example, the secondary market bond transaction data may be received daily from one or more trade reporting and compliance engines. Table 2 shows example eligibility criteria for secondary market bond transaction data.

TABLE 2

Example Secondary Market Bond Transaction Eligibility Criteria

| Category | Criteria |
| --- | --- |
| Bond Issuer | Eligible Issuer Banks |
| Issuance Currency | USD |
| Issuance Size | ≥USD $500M |
| Transaction size | ≥=USD 5M |
| Bond Type | Fixed coupon bond. No economic calls prior to 30 days before maturity |
| Coupon Range | ≥1 percent and ≤5 percent, subject to adjustment over time based upon the current interest rate environment |
| Calendar days to maturity of the bond at settlement of transaction | ≥20 and ≤500 |

The data verifier 309 may apply one or more eligibility criteria to the wholesale primary market funding transaction data and secondary market bond transaction data to ensure the input data is representative of the economic reality the yield curve or BYI is designed to measure. The one or more eligibility criteria may include one or more of: funding transaction type, funding transaction counterparty, funding/bond transaction size, bond type (e.g., coupon type and call eligibility), coupon range, days to maturity of the bond, bond issuance size, effective date of transaction relative to trade date.

In an example, the data verifier 309 may process the wholesale primary market funding transaction data and secondary market bond transaction data by reference to these eligibility criteria.

At Step 612, the eligible transaction data collected within the relevant data collection period may be sorted into one or more tenor groups by the data sorting module 311. The sorting may be based on criteria such as (for example) days to maturity (of the funding transaction or the relevant bond). The eligible data may be allocated into specific tenor groups based on specified maturity ranges (e.g., for a one-month tenor group, the range may be 20 to 49 calendar days). Table 3 illustrates example tenor groups from one week (1 W) to great than twelve months (>12M) and corresponding maturity ranges.

TABLE 3

Example Tenor groups

| Tenor Period | From (calendar days except where noted) | To (calendar days except where noted) |
| --- | --- | --- |
| 1 W | 5 (business days) | 19 (calendar days) |
| 1 M | 20 | 49 |
| 2 M | 50 | 79 |
| 3 M | 80 | 100 |
| 4 M | 101 | 125 |
| 5 M | 126 | 149 |
| 6 M | 150 | 210 |
| 7 M | 211 | 234 |
| 8 M | 235 | 258 |
| 9 M | 259 | 282 |
| 10 M | 283 | 305 |
| 11 M | 306 | 329 |
| 12 M | 330 | 390 |
| >12 M | 391+ | |

Each tenor group may have a target volume (e.g., a total volume threshold) and/or number of transactions (e.g., 10 transactions). In some examples, overall thresholds may cover all tenor groups and/or thresholds may be applied at the tenor group level. Each data collection period may also have a target aggregate volume and/or a target aggregate number of transactions.

At Step 614, if the data sorting module 311 determines that a specific tenor group has been allocated fewer transactions (or less than a total transaction volume) than the minimum number, or the entire data collection period (e.g., 5 days) has fewer than the target aggregate volume and/or number of transactions, the data verification module 309 may allocate eligible transaction data executed during the preceding day or days (e.g., 5 days) to reach the minimum value. If the volume and/or number of transactions for the tenor group is still less that the target value, or the volume and/or number of transactions for the entire data collection period is still below that the target value, eligible transaction data from the next preceding day may also be allocated to reach the minimum value. This procedure may continue until one of the following conditions is met: the minimum number or volume of transactions is reached or a maximum number of lookback days is exceeded (e.g., 10 days). After the maximum number of days is exceeded, a contingency procedure may be applied to generate a value. Additional adjustments may apply in the event of policy rate changes or exceptional market circumstances.

Next, at Step 616, once the above conditions are met, the data adjustment module 317 may adjust the wholesale primary market funding transaction data and the secondary market bond transaction data. The adjustments applied to the wholesale primary market funding transaction data and the secondary market bond transaction data may be similar or different. In one example, for secondary market bond transaction data, the data processing module 312 may convert yields to an annualized money market basis.

In another example, the data adjustment module 317 may assign a weighting to each eligible wholesale primary market funding transaction and each eligible secondary market bond transaction. In one example, this may be a weighting of 100 percent to each eligible wholesale primary market funding transaction and a weighting of 50 percent to each eligible secondary market bond transaction. In another example, the same weighting may be applied to each transaction data type.

It should be noted that different weights are considered and may include any combination of weighting. For example, a three-tiered weighting system may be used for the different types of inputs. To illustrate, a weighting of 100 percent may applied to all wholesale primary market funding transaction data, a 25 percent weight may be applied to secondary market bond transactions with volumes greater than USD $5M, and a 10 percent weight may be applied to secondary market bond transactions with volumes between USD $2M and USD $5M.

In an example, transaction data from earlier days in a data collection period, or from days prior to the collection period, where required to meet minimum thresholds, may be assigned the same weight as the current day's data. In another example, the transaction data from earlier days may be assigned a reduced weighting relative to the current day's transactions. In yet another example, the transaction data from earlier days may also be adjusted by reference to movements in market rates (e.g., term nearly risk-free rates or overnight index swaps ("OIS") since the date of execution). In some examples, weightings and other adjustments may be applied cumulatively. For example, an eligible bond transaction may be adjusted by multiplying by its weighting relative to funding transactions and by further multiplying by an OIS adjustment factor.

Eligible bond transactions may also be weighted, where necessary or desired, to ensure that no single bond issuer represents over a threshold percentage (e.g., 10 percent) of the bond transactions used to construct the yield curve for any given day. If, on any given calculation day, there are fewer than a certain number (e.g., ten (10)) issuers of bonds represented in the yield curve, then the threshold percentage may be increased to (100÷number of issuers) percent.

The eligible bond transactions weighting process described above may utilize an iterative approach. For example, in Step 1 of an iterative approach, each issuer may be assigned a "token count" equal to the number of eligible bond transactions in respect of that issuer that are used to calculate the yield curve for a given calculation day. In Step 2, a maximum token count any individual issuer is permitted for a given calculation day may be determined as: (threshold percentage×aggregate of the token counts across all issuers for that day) rounded down to the nearest whole number (≥1). In Step 3, if the token count for any individual issuer exceeds this maximum token count, that issuer may be assigned a reduced token count equal to the maximum (if not, no weighting process is necessary). In Step 4, if a reduction occurs for any issuer, Steps 1-3 may be repeated. In Step 5, once no reduction occurs after repeating Steps 1-3, the weight for each transaction of each issuer may be set as: reduced token count for that issuer divided by original token count for that issuer. The weighting may be one (1) for issuers that were not subject to a reduction; and <1 for those that were. All bond transaction data may be converted to an annualized money market basis.

At Step 618, the data processing module 312 may generate a yield curve using the filtered, sorted and adjusted primary market funding transaction data and secondary market bond transaction data. The yield curve may be plotted for display via, for example, a graphical user interface. The yield curve may be constructed using, for example, a robust regression best fit of all eligible data points.

At Step 620, the values for the publication tenors (e.g., one-month, three-month, and six-month) for the calculation day (excluding, for example, any tenor group which has insufficient eligible transaction data) may be identified from the yield curve at specified points on the yield curve. For example, these points may be the 30, 91 and 182 days-to-maturity points on the yield curve. For tenor groups and/or collection periods with insufficient eligible transaction data, a contingency policy may apply. At Step 622, the yield curve and the values may be transmitted to the one or more remote devices 107 via the data distribution device 105. In an example, the yield curves and the values may be transmitted to the one or more remote devices 107 at a set frequency, such as daily. The transmission of the yield curves and the values may include publishing this information to one or more websites for display via the Internet.

Figure 7:
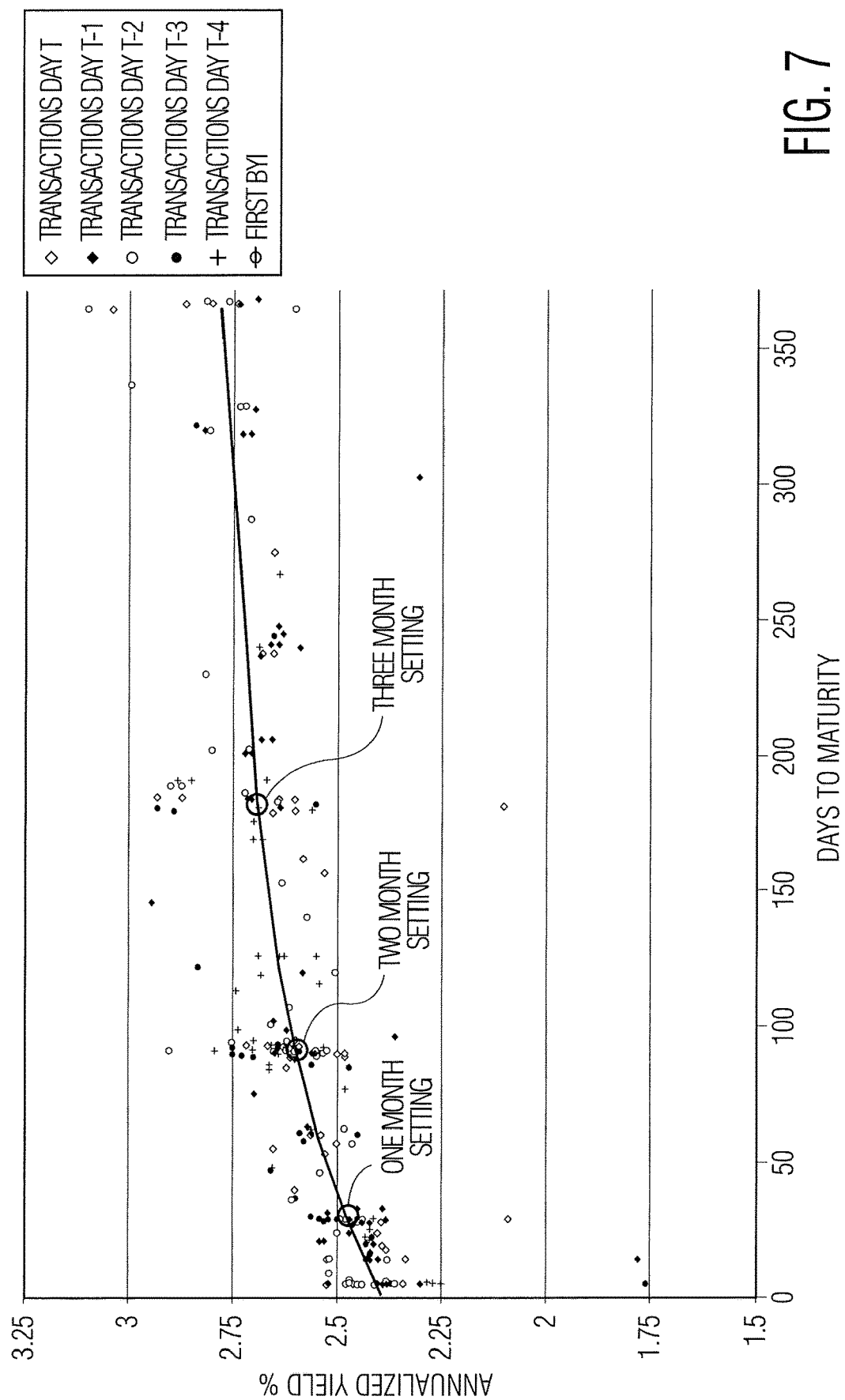
FIG. 7 is chart illustrating a first bank yield curve according to the present disclosure from which bank yield index (BYI) values may be taken.

Referring now to FIG. 7, a first example of how yield curve and values for publication tenors may be generated by the process of FIG. 6 is shown. In this example, a first bank yield curve may be generated. The first bank yield curve may measure the average yield at which investors are willing to invest U.S. dollar funds over one or more periods of time (e.g., one-month, three-month, and six-month periods) on a senior, unsecured basis in large, internationally active banks operating in the wholesale U.S. dollar markets for a specified time horizon (e.g., up to one year). The first bank yield curve may be generated through a process of curve-fitting a number of eligible transaction data points. The x-axis of the bank yield curve may be days to maturity and the y-axis may be an annualized yield percentage.

The transactional data points may be sourced from Day T, Day T−1, Day T−2, Day T−3, and Day T−4, and may be used to derive the bank yield curve value for Day T and published on day T+1. From these transactional data points, a best-fit yield curve may be constructed from which one-month, three-month and six-month BYI settings (representing values for different tenors) may be determined. In the example shown in FIG. 7, 355 transactional data points are used. Table 4 shows the transactions:

TABLE 4

| | Transactions | |
|---|---|---|
| Source Day | Funding Transactions | Bond Transactions |
| T | 60 | 11 |
| T-1 | 46 | 17 |
| T-2 | 62 | 33 |
| T-3 | 40 | 9 |
| T-4 | 54 | 23 |

An aggregate volume of the funding transactions may be, for example, USD $26.1 billion.

The values for the one-month, three-month and six-month term settings may be taken from the curve at the 30, 91, and 182 days to maturity points, respectively. These values are included in the Table 5, together with a corresponding conventional benchmark interest rate index rate published on the same day.

TABLE 5

| Values from First Bank Yield Curve | | |
|---|---|---|
| Tenor | Bank Yield Index (%) | Conventional Benchmark (%) |
| One-Month | 2.48142 | 2.48188 |
| Two-Month | 2.59911 | 2.59850 |
| Three-Month | 2.69339 | 2.68213 |

Figure 8:
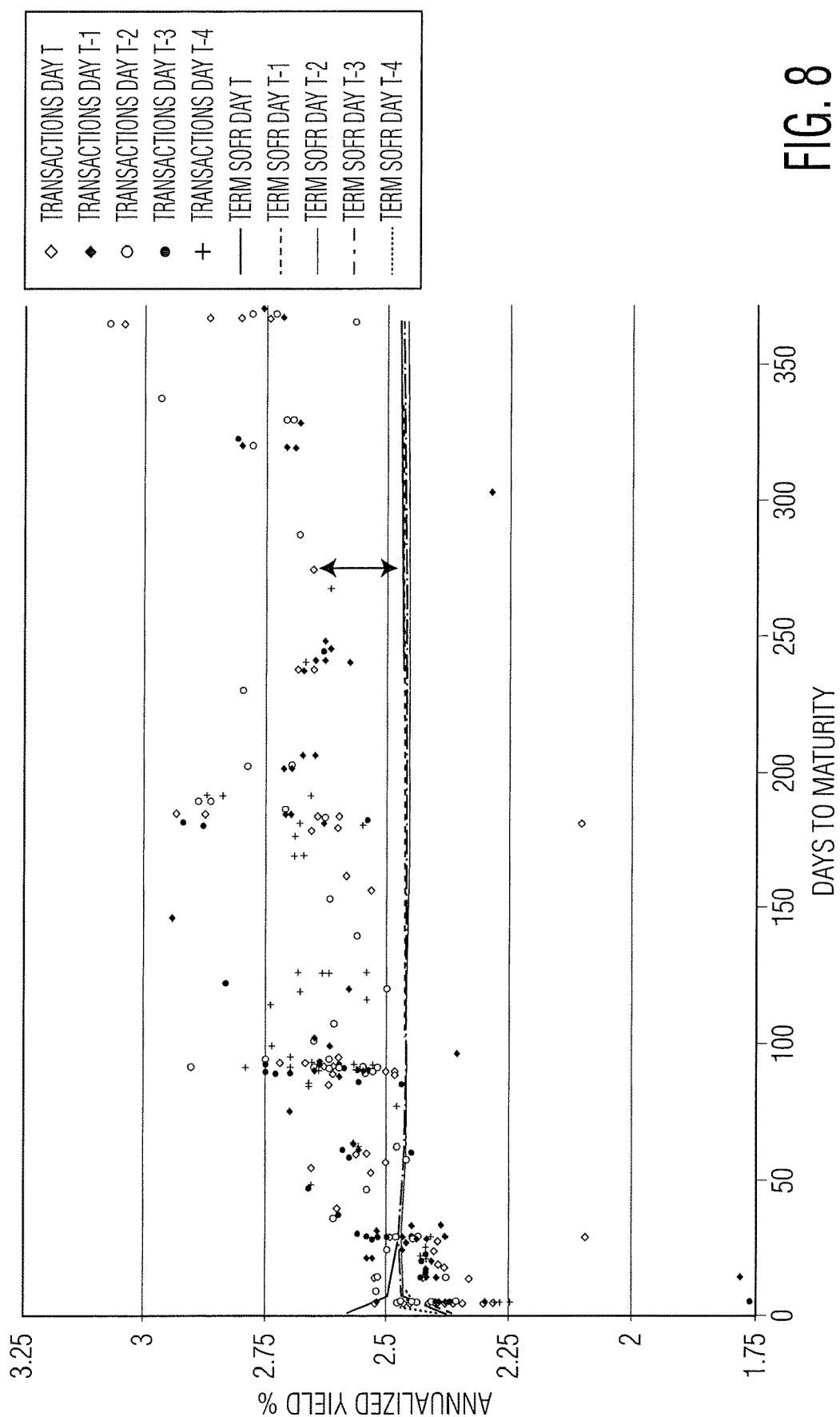
FIG. 8 is a chart illustrating how an implied credit spread is derived for a transaction, based on its vertical distance from a term risk free rate (e.g., the Secured Overnight Financing Rate (SOFR)) yield curve for the same day.
Figure 9:
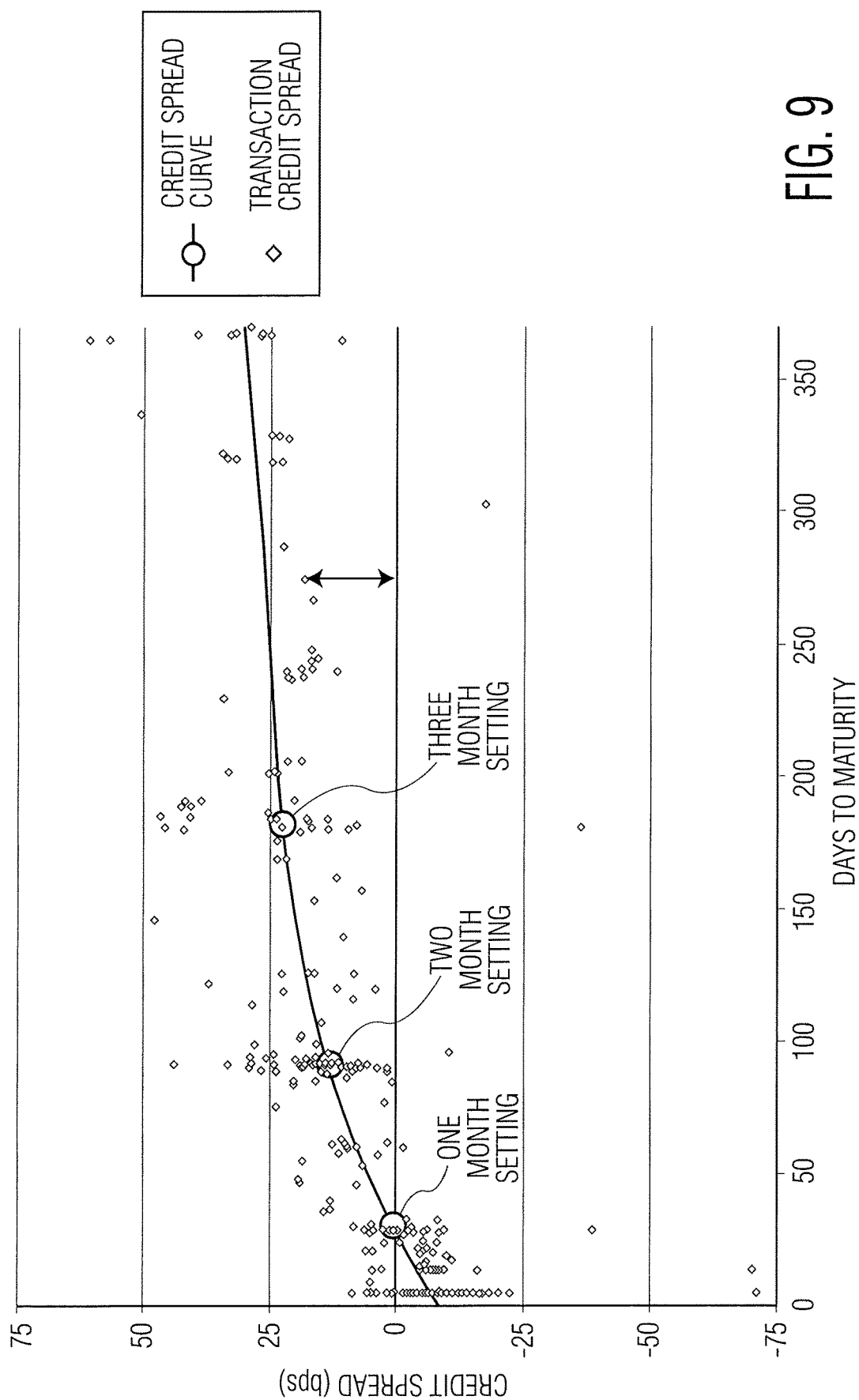
FIG. 9 is a chart illustrating how an implied credit spread curve is constructed based upon the implied credit spreads.
Figure 10:
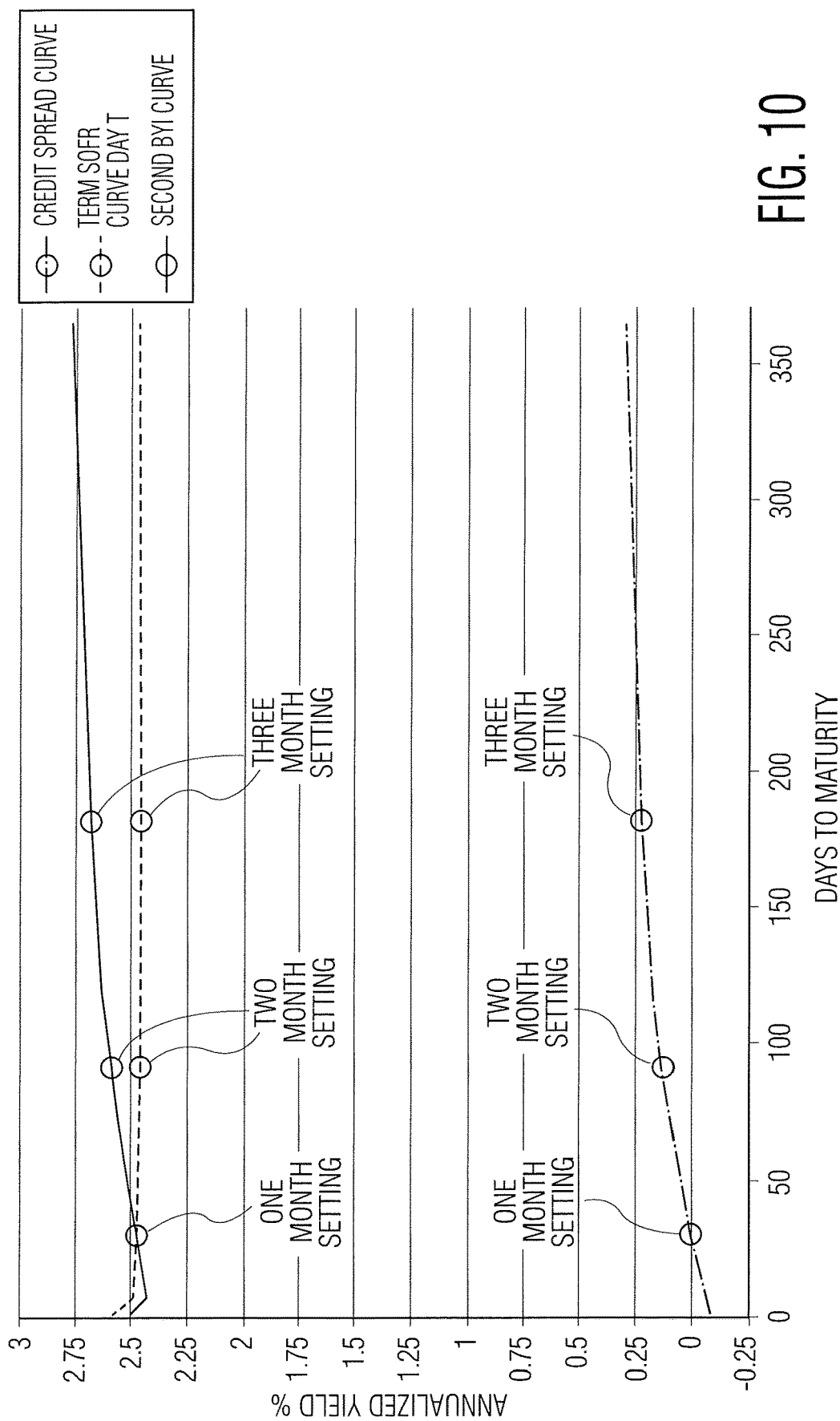
FIG. 10 is a chart illustrating a second bank yield curve constructed from an implied credit spread curve and a term risk free rate (e.g., SOFR) curve according to the present disclosure from which BYI values may be taken.

Referring now to FIGS. 8-10, another example yield curve and values for publication tenors generated by the process of FIG. 6 is shown. In this example, a second bank yield curve may be generated by combining a term nearly risk-free rate curve and a credit spread curve fitted to a number of implied credit spread data points, which may be derived by subtracting a value on the term nearly risk-free rate curve at a given time for the relevant maturity from each transaction yield data point. It should be noted, any other suitable processing criteria, including those described herein at Step 602 to Step 622 (e.g., receipt, filtration, storage, retrieval, application of eligibility criteria, sorting, adjustment and yield curve generation) may be utilized in respect of other input data according to the particular implementation, such as, for example, processing data from derivatives referencing nearly risk-free rates and historical nearly risk free-rate data.

Using this approach, each transaction input data point may be converted to reflect the implied credit spread of the relevant transaction yield over a notional term "risk free" rate curve (e.g. a SOFR curve) by subtracting the value on the term nearly risk-free rate curve at a given time for the relevant maturity from each transaction yield data point. The resulting converted "credit spread" inputs may then be used to generate a fitted-curve representing borrowing spreads only (i.e., a credit spread curve). This may be added back to the notional "risk free" rate curve (e.g., the implied term SOFR curve at a certain point in time) in order to produce a composite bank yield curve and the associated BYI values.

This approach acknowledges the different underlying dynamics of the credit and rates markets. Credit trends generally evolve over longer time periods, with interest rate expectations potentially changing more rapidly based upon either realized rate changes or changes in expectations regarding monetary policy. Separating the yield curve into discrete parts allows for separate methodologies to be used for the credit risk and nearly risk-free rate components of the transaction yield data reflecting these dynamics. The credit-spread curve methodology may more closely model the movement of credit-sensitive transaction data over the transaction window (e.g., 5 days) when compared with a combined curve. In addition, the term nearly risk-free rate curve may incorporate more granular information on daily market rate adjustments (for example, based on realized risk free rate (e.g., SOFR) data and derivatives transactional data relating to expected future risk free rate (e.g., SOFR) settings).

The second bank yield curve and BYI values may be representative of senior, unsecured bank credit risk in the wholesale funding market over time. This approach may also offer the possibility of publishing the credit spread and term nearly risk-free rate elements of the second bank yield curve separately, giving market participants greater transparency as to the constituent elements of the second bank yield curve, while at the same time retaining a *nexus* to an overnight nearly risk-free reference rate.

In this example, primary market funding and secondary market bond transaction data points are sourced, filtered, weighted and normalized in the same manner as for the first bank yield curve described above. However, the calculation process may incorporate one or more of the following changes.

First, a term nearly risk-free rate (e.g., SOFR) yield curve may be constructed from information that may include historical nearly risk-free rate data and data in respect of derivatives referencing nearly risk-free rate data. There may be no day-on-day adjustment for movements in market rates during the collection window. Instead, the value on the term nearly risk-free rate (e.g. SOFR) curve at a given time for a relevant maturity may be subtracted from each transaction yield data point to generate implied credit spreads for each transaction. Next, a curve may be fitted to the implied credit spreads rather than to the transaction yields themselves. This fitted credit spread curve may be added to the current term nearly risk-free rate (e.g., SOFR) yield curve to produce the second bank yield curve from which the required one-month, three-month and six-month BYI values may be obtained.

FIG. 8 shows an example of how an implied credit spread is derived for each transaction, based on its vertical distance from the term nearly risk-free rate (e.g., SOFR) curve for the same day. The x-axis may be days to maturity and the y-axis may be an annualized yield percentage. Term nearly risk-free rate (e.g., SOFR) rates for each applicable effective day may be subtracted from each of the yields associated with the wholesale, senior, unsecured transaction data points for that day in order to produce implied credit spreads for each transaction. An implied credit spread may be derived for each transaction, based on its vertical distance from the term nearly risk-free rate (e.g., SOFR) curve for the same day. The arrow indicates the implied credit spread for a single transaction on Day T. The transactions for each day are color-coded (or shaded) to match the implied term nearly risk-free rate (e.g., SOFR) yield curve for the same day.

As shown in FIG. 9, these implied credit spreads, taken together on a rolling five-day basis, may be plotted on a chart having an x-axis of days to maturity and a y-axis of credit spread (bps). A robust regression algorithm may be applied to generate a credit-spread curve. The one-month, three-month, and six-month credit-spread settings may then be determined from this curve. The arrow on the chart indicates the credit spread derived for the same transaction highlighted in FIG. 8.

FIG. 10 shows how the implied credit spread curve can be added to the term nearly risk-free rate (e.g., SOFR) curve to construct a credit sensitive yield curve (i.e., the second bank yield curve) from which one-month, three-month and six-month BYI values may be obtained. The second bank yield curve may have an x-axis of days to maturity and a y-axis of annualized yield percentage.

The second bank yield curve may be generating using the same 355 transaction data points described above with reference to Table 4. The notional term nearly risk-free rate (e.g., SOFR) curve may be generated based on realized nearly risk-free (e.g., SOFR) rates and nearly risk-free rate (e.g., SOFR) futures settlement prices. The values for the one-month, three-month and six-month term settings may be taken from the curve at the 30, 91, and 182 days to maturity points, respectively. These values are included in Table 6, together with the corresponding conventional benchmark interest rate index rate published on the same day.

TABLE 6

Values from Second Bank Yield Curve

| Tenor | Bank Yield Index (%) | Conventional Benchmark (%) |
|---|---|---|
| One-Month | 2.48895 | 2.48188 |
| Two-Month | 2.59734 | 2.59850 |
| Three-Month | 2.68935 | 2.68213 |

The second bank yield curve may also be shown in its component parts derived through this alternative methodology. The term nearly risk-free rate (e.g., term SOFR) can be separated from the credit-sensitive supplement (i.e., the credit spread) as illustrated in Table 7 below.

TABLE 7

Components of Second Bank Yield Curve

| Tenor | Bank Yield Index (%) | Term SOFR Component (%) | Credit Spread Component (bps) |
|---|---|---|---|
| One-Month | 2.48895 | 2.47476 | 1.4 |
| Two-Month | 2.59734 | 2.46223 | 13.5 |
| Three-Month | 2.68935 | 2.46321 | 22.6 |

This approach may allow end-users to have greater transparency regarding the economic drivers behind the constituent elements of the second bank yield curve. In addition, it may also allow for the use of a credit spread component as a supplement in lending transactions that use realized compounded nearly risk-free rates (e.g., SOFR), where appropriate.

Actual transaction rates/yields/credit spreads may vary, even for transaction data having the same time to maturity/time to bond maturity for the same bank that are executed on the same day. Accordingly, the curve may not simply be drawn through the known data points. Rather, a single curve may need to be fitted to the known data points for a given day using a methodology that best represents the range of eligible transaction rates/yields at each applicable maturity point.

The selection of a curve-fitting approach may depend, in part, on assumptions that may be reasonably made regarding the underlying data and the resulting yield curve. For instance, a straight line, a simple parabola, and an oscillating curve (e.g., a 6th order polynomial) might each be considered a "good fit" to the same data, depending on initial assumptions.

While the shape of a yield curve of the present disclosure may vary according to market conditions, it may be assumed to be a smooth continuous curve that does not oscillate. Two classes of curve-fitting algorithms may be used. The first class is parametric, where the entire curve is represented by a single function with a set of parameters that determine its shape. The second class is spline-based, where a number of localized fitted curves are smoothly joined together.

In each case, curve-fitting may comprise a method of finding a "best fit" curve that best represents the available data points (i.e., minimizing some measure of net distance of the data points from the curve). One approach may include determining a curve that minimizes the average (mean) of the squares of the vertical (y-axis) distances between each data point and the curve (i.e., a "least squares" regression). For example, may be based on a parametric model, fitting to a third order polynomial ($y=ax^3+bx^2+cx+d$). This may allow the curve to have one or two turning points and some variation in curvature, while still being a relatively simple function. In the case of a parametric model, a change to any individual data point may affect the shape of the entire curve, but the curve itself will remain smooth. In the case of a spline-based model, individual data points may have less impact on the shape of the whole curve because each localized curve section is able to move largely independently of the others, but the resulting curve may be more likely to oscillate.

In either a simple polynomial or a spline-based regression, outlier data points may potentially distort either part or the whole of the curve. An outlier exclusion approach, based on rejecting points located very far from an initial curve calculation, may help reduce their impact. However, any outlier exclusion approach may rely on setting an appropriate sensitivity range (with the intention being able to exclude only unrepresentative points markedly different in value from an initially calculated curve), so that the final curve does not deviate too far from the available market information and result in an unrepresentative index. For example, outliers may be excluded based on their (vertical) distance from the calculated curve (e.g., a +/−100 bps sensitivity).

A robust regression methodology (e.g., without outlier exclusion) may also be used to address outlier data points. This approach may use multiple iterations to find a best-fit curve, with data points nearer to the curve given the greatest weight to minimize the influence of relative outliers. In view of the possibility of occasional erroneous and unrepresentative transaction reports, this approach may also be used in conjunction with a check for extreme outliers. This may be expected to use a wide threshold (e.g., between 100 bps and 200 bps from the average for the relevant tenor) with the intention of excluding only clearly erroneous and unrepresentative transaction reports.

In the event that insufficient transaction data points are available to produce the first bank yield curve or the second bank yield curve (e.g., to generate the one-month, three-month and six-month settings, as might be the case during a period of market illiquidity), a contingency plan may be enacted. For example, the data structure management system 100 may publish the settings that were last determined based upon transaction input data using the applicable BYI methodology, adjusted for movements in "risk free" rates (e.g. OIS, U.S. treasury yields, implied term SOFR rates, etc.). This may allow for the continued publication of the yield curves and BYI during periods of market illiquidity. These contingency settings may incorporate both the most recently available eligible credit sensitive transaction data (i.e., the most recent BYI setting derived from the relevant transaction data inputs using the BYI methodology as opposed to the contingency policy) and "risk free" rates data in order to ensure the contingency rates are representative of, and responsive to, market conditions at the time. The BYI may resume publication in accordance with the methodologies disclosed herein as soon as enough primary market funding and/or secondary market bond transaction/and or other necessary/suitable input data points become available.

Figure 11:
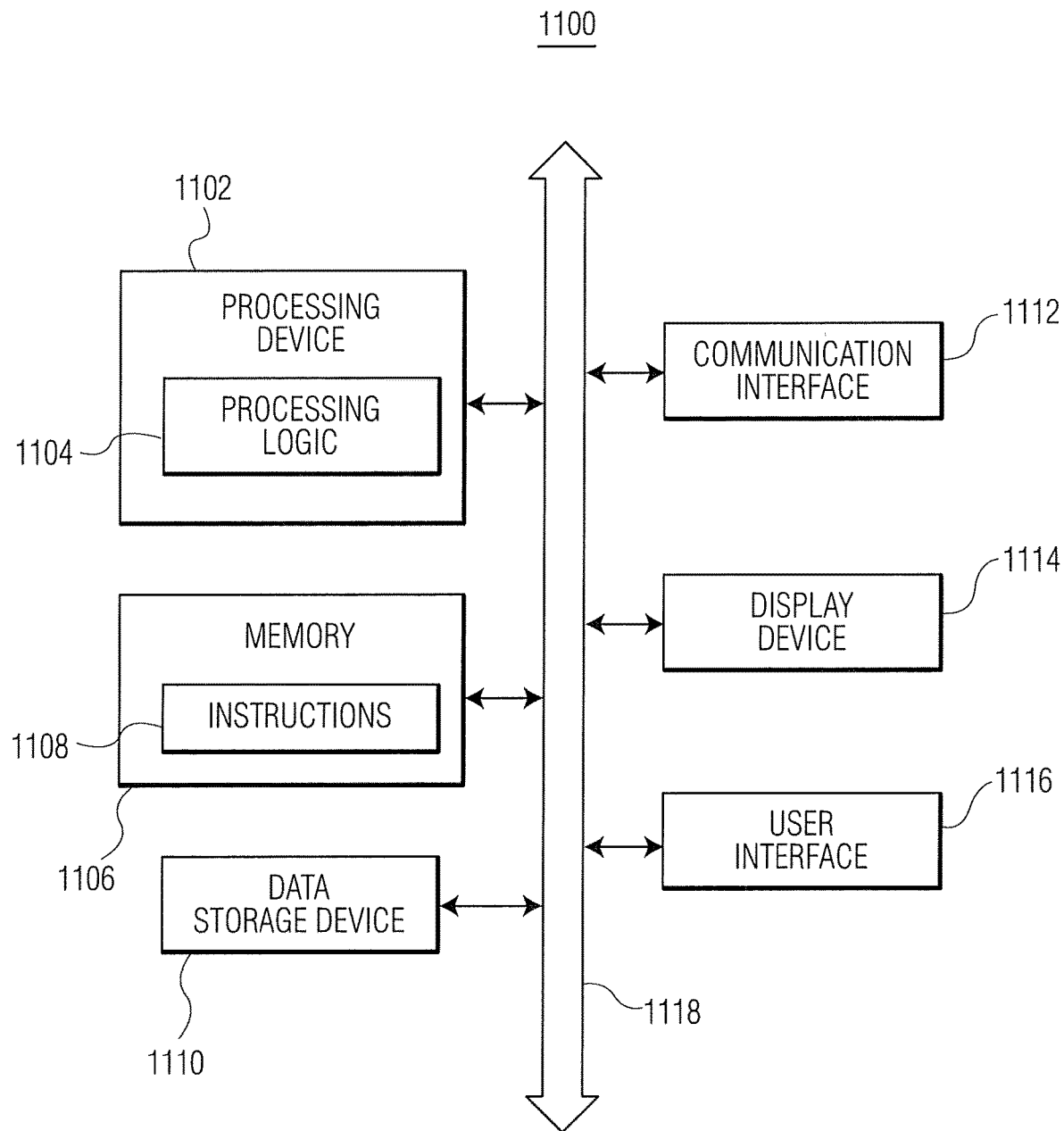
FIG. 11 is a functional block diagram illustrating an example computer system according to the present disclosure.

Referring now to FIG. 11, a functional block diagram illustrating an example computer system 1100 is shown. The computer system 1100 may be used in one or more of the one or more data source devices 109, the data structure management system 100, and the one or more remote devices 107 described above. In some examples, the computer system 1100 may be connected (e.g., networked) to other machines as described above. The computer system 1100 may operate in the capacity of a server or a client machine in a client-server network environment, or as a peer machine in a peer-to-peer (or distributed) network environment. The computer system 1100 may be any special-purpose machine capable of executing a set of instructions (sequential or otherwise) that specify actions to be taken by that machine for performing the functions describe herein.

Further, while only a single computer system 1100 is illustrated, the term "machine" shall also be taken to include any collection of machines that individually or jointly execute a set (or multiple sets) of instructions to perform any one or more of the methodologies discussed herein.

The example computer system 1100 may include processing device 1102, memory 1106, data storage device 1110 and communication interface 1112, which may communicate with each other via data and control bus 1118. In some examples, computer system 1100 may also include display device 1114 and/or user interface 1116.

Processing device 1102 may include, without being limited to, a microprocessor, a central processing unit, an application specific integrated circuit (ASIC), a field programmable gate array (FPGA), a digital signal processor (DSP), a network processor and/or a suitable special-purpose processing device specially programmed with processing logic 1104 to perform the operations described herein.

Memory 1106 may include, for example, without being limited to, a read-only memory (ROM), a random access memory (RAM), a flash memory, a dynamic RAM (DRAM), a static RAM (SRAM) and/or a suitable non-transitory computer readable storage medium storing computer-readable instructions 1108 executable by processing device 1102 for performing the operations described herein. Although one memory device 1108 is illustrated in FIG. 11, in some examples, computer system 1100 may include two or more memory devices (e.g., dynamic memory and static memory).

Computer system 1100 may include communication interface device 1112, for direct communication with other computers (including wired and/or wireless communication) and/or for communication with a network. In some examples, computer system 1100 may include display device 1114 (e.g., a liquid crystal display (LCD), a touch sensitive display, etc.). In some examples, computer system 1100 may include user interface 1116 (e.g., an alphanumeric input device, a cursor control device, etc.).

In some examples, computer system 1100 may include data storage device 1110 storing instructions (e.g., software) for performing any one or more of the functions described herein. Data storage device 1110 may include any suitable non-transitory computer-readable storage medium, including, without being limited to, solid-state memories, optical media and magnetic media.

For purposes of this disclosure, the term "computer" shall refer to an electronic device or devices, including those specifically configured with capabilities to be utilized in connection with a data conversion and distribution system according to the present disclosure, such as a device capable of receiving, transmitting, processing and/or using data and information in the particular manner and with the particular characteristics described herein. The computer may include a server, a processor, a microprocessor, a personal computer, such as a laptop, palm PC, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television, an electronic pager or any other computing and/or communication device specifically configured to perform one or more functions described herein.

The term "network" shall refer to one or more networks, including those capable of being utilized in connection with a data conversion and distribution system described herein, such as, for example, any public and/or private networks, including, for instance, the Internet, an intranet, or an extranet, any wired or wireless networks or combinations thereof.

The term "user interface" shall refer to a suitable type of device, connection, display and/or system through which information may be conveyed to and received from a user in accordance with the present disclosure, such as, without limitation, a monitor, a computer, a graphical user interface, a terminal, a screen, a keyboard, a touchscreen, a biometric input device that may include a microphone and/or camera, a telephone, a personal digital assistant, a smartphone, or an interactive television.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

The term "or" may be construed in an inclusive or exclusive sense. Similarly, the term "for example" may be construed merely to mean an example of something or an exemplar and not necessarily a preferred means of accomplishing a goal.

As described above, examples of the present disclosure relate to data structure management systems and methods for data isolation and the creation of data metrics such as a yield index, a bank yield index, etc. The data structure management systems and methods of the present disclosure may isolate correct data from among one or more data sources, and convert the isolated data into one or more data metrics such as, without being limited to, a bank yield index. Systems and methods of the present disclosure are operationally efficient (e.g., by isolating, analyzing, adjusting and appropriately and pertinently processing only the correct data) and may result in the creation of more accurate data metrics (e.g., through analysis of only the correct, isolated data).

Moreover, the data structure management systems provide technical improvements over conventional systems and techniques. This is because the data structure management systems of the present disclosure include an unconventional technique of isolating and appropriately and pertinently using only the correct data among data obtained from among one or more networked data sources. The unconventional technique is able to isolate correct data even when the data sources provide sparse or concentrated data sets. The ability to isolate (e.g., filter) only the correct data even in sparse/concentrated data sets and appropriately and pertinently process this data does not exist in conventional systems/techniques and, thus, conventional systems/techniques may produce inaccurate and unreliable or inappropriate data metrics.

While the present disclosure has been discussed in terms of certain examples, it should be appreciated that the present disclosure is not so limited. The embodiments are explained herein by way of example, and there are numerous modifications, variations and other embodiments that may be employed that would still be within the scope of the present invention.

The invention claimed is:

1. A system for isolating electronic data and generating enhanced data, the system comprising:
a data subscription unit having at least one data interface communicatively coupled to one or more data source devices, the data subscription unit configured to receive data having a plurality of data formats from the one or more data source devices;
a modeling unit comprising one or more servers, a non-transitory memory, and one or more processors comprising machine readable instructions, the modeling unit communicatively coupled to the data subscription unit, the modeling unit further comprising:
a data receiver module configured to receive the data from the data subscription unit via a secure communication channel over at least one network,
a data verifier configured to determine an eligibility of the data based on one or more eligibility criteria,
a data sorting module configured to sort the eligible data into one or more groups, the sorting based on at least one of a sorting parameter and a minimum aggregate value for at least one attribute of the eligible data,
a data adjustment module configured to adjust the sorted eligible data based on one or more adjustment parameters, and
a data processing module configured to:
process the adjusted eligible data to generate first data metrics over a defined set of time periods, the first data metrics comprising rate data,
process the first data metrics to generate second data metrics, and
derive specified values from one or more of the first data metrics and the second data metrics; and
a data distribution device configured to transmit one or more of the first data metrics, the second data metrics, and the values to one or more remote devices, the data distribution device comprising a non-transitory memory configured to store the first data metrics, the second data metrics, and the values and at least one data distribution interface configured to provide secure communications with the one or more remote user devices,
the one or more remote user devices configured to:
receive, via a data distribution receiver interface, the first data metrics, the second data metrics, and the values from the data distribution device,
display, via a user display interface, at least the first data metrics and the second data metrics simultaneously on a single graphical display,
receive, via a user information interface, user input data,
generate, via one or more processors, supplementary projected data based on one or more of the first data metrics, the second data metrics, and the values based on the user input data, and
display, via the user display interface, the supplementary projected data.

2. The system of claim 1, wherein the data verifier is further configured to retrieve the one or more eligibility criteria from one or more reference databases.

3. The system of claim 1, wherein the at least one sorting parameter comprises a time to maturity of the eligible data.

4. The system of claim 1, wherein data subscription unit is further configured to:
receive the data having the plurality of data formats pre-filtered from the one or more data source devices; and
filter the data having the plurality of data formats pre-filtered based on one or more filter criteria, the filter criteria comprising at least one of a transaction data and a value date.

5. The system of claim 4, wherein the data sorting module is further configured to:
determine that a minimum number and/or volume of data points of at least a first group of the one or more groups is not met; and
add additional data to the at least the first group to meet the minimum number and/or volume of data points.

6. The system of claim 5, where the data adjustment module is further configured to apply one or more weights to at least a portion of the data points.

7. The system of claim 1, wherein the data having a plurality of data formats comprises, at least, wholesale primary market funding transaction data and secondary market bond transaction data, said data being received during one or more particular time periods.

8. The system of claim 7, wherein the data adjustment module is further configured to assign the wholesale primary market funding transaction data at least a first weight and assign the secondary market bond transaction data at least a second weight.

9. The system of claim 1, wherein the one or more eligibility criteria comprises one or more of: transaction type, counterparty type, funding location, maturity range, minimum transaction size, obligation type, maturity range, issuance size, and coupon range, depending on the data type.

10. The system of claim 1, further comprising:
a surveillance module configured to perform one or more of surveillance, administration and supervision of the modeling unit contemporaneously with the data collection and calculation, and/or post-publication, the surveillance module further configured to receive one or more inputs.

11. The system of claim 1, wherein the first data metrics comprise a first bank yield curve and the second data metrics comprise a second bank yield curve.

12. The system of claim 11, wherein the data processing module is further configured to generate the first bank yield curve by:
charting the weighted, adjusted and/or sorted eligible data based on annualized yield and days to maturity;
performing a check for outlier data points; and
creating a curve using a curve-fitting methodology comprising one or more of a least squares best fit to a third polynomial order and a robust regression.

13. The system of claim 11, wherein the data processing module is further configured to derive the specified values by extrapolating data points at each period of time represented by the one or more groups from the among the first bank yield curve and the second bank yield curve.

14. The system of claim 1, wherein the one or more groups comprise one or more tenor groups representing, at least, a one month period, a three month period, and a six month period.

15. The system of claim 1, wherein the data adjustment module is further configured to normalize the sorted eligible data responsive to one or more of: a bond issuer representing more than a threshold percentage of bond transactions, changes in market rates, and conversions between different price/yield quotation conventions.

16. A method for isolating electronic data and generating enhanced data, the method comprising:
receiving, by a data subscription unit having at least one data interface communicatively coupled to one or more data source devices, data having a plurality of data formats from the one or more data source devices;
receiving, by a data receiver module of a modeling unit, the data from the data subscription unit via a secure communication channel over at least one network, the modeling unit communicatively coupled to the data subscription unit and comprising one or more servers, a non-transitory memory, and one or more processors comprising machine readable instructions;
determining, by a data verifier of the modeling unit, an eligibility of the data based on one or more eligibility criteria;
sorting, by a data sorting module of the modeling unit, the eligible data into one or more groups, the sorting based on at least one sorting parameter or a minimum aggregate value for at least one attribute of the eligible data;
adjusting, by a data adjustment module, the sorted eligible data based on one or more adjustment parameters;
processing, by a data processing module, the adjusted eligible data to generate first data metrics over a defined set of time periods, the first data metrics comprising rate data;
processing, by the data processing module, the first data metrics to generate second data metrics;
deriving, by the data processing module, specified values from one or more of the first data metrics and the second data metrics; and
transmitting, by a data distribution device, one or more of the first data metrics, the second data metrics, and the values to one or more remote devices, the data distribution device comprising a non-transitory memory configured to store the first data metrics, the second data metrics, and the values and at least one data distribution interface configured to provide secure communications with the one or more remote user devices, the one or more remote user devices configured to:
receive, via a data distribution receiver interface, the first data metrics, the second data metrics, and the values from the data distribution device,
display, via a user display interface, at least the first data metrics and the second data metrics simultaneously on a single graphical display,
receive, via a user information interface, user input data,
generate, via one or more processors, supplementary projected data one or more of the first data metrics, the second data metrics, and the values based on the user input data, and
display, via the user display interface, the supplementary projected data.

17. The method of claim 16, further comprising:
retrieving, by the data verifier, the one or more eligibility criteria from one or more reference databases.

18. The method of claim 16, wherein the at least one sorting parameter comprises a time to maturity of the eligible data.

19. The method of claim 16, further comprising one or more of:
receiving, by the data subscription unit, the data having the plurality of formats pre-filtered data from the one or more data source devices; and
filtering, by the data subscription unit, the data having the plurality of formats based on one or more filter criteria, the filter criteria comprising at least one of a transaction date and a value date.

20. The method of claim 19, further comprising:
determining, by the data sorting module, that a minimum number and/or volume of data points of at least a first group of the one or more groups is not met; and
adding, by the data processing module, additional data to the at least the first group to meet the minimum number and/or volume of data points.

21. The method of claim 20, further comprising:
applying, by the data adjustment module, one or more weights to at least a portion of the data points.

22. The method of claim 16, wherein the data having a plurality of data formats comprises, at least, wholesale primary market funding transaction data and secondary market bond transaction data, said data being received during one or more particular time periods.

23. The method of claim 22, further comprising:
assigning, by the data adjustment module, the wholesale primary market funding transaction data at least a first weight and assign the secondary market bond transaction data at least a second weight.

24. The method of claim 16, wherein the one or more eligibility criteria comprises one or more of: transaction type, counterparty type, funding location, maturity range, minimum transaction size, obligation type, maturity range, issuance size, a number of duplicate data points, and coupon range, depending on data type.

25. The method of claim 16, further comprising:
performing, by a surveillance module, one or more of surveillance, administration and supervision of the modeling unit contemporaneously with the data collection and calculation, and/or post-publication, the surveillance module further configured to receive one or more input.

26. The method of claim 16, wherein the first data metrics comprise a first bank yield curve and the second data metrics comprise a second bank yield curve.

27. The method of claim 26, further comprising:
generating, by the data processing module the first bank yield curve by charting the weighted, adjusted and/or sorted eligible data based on annualized yield and days to maturity;
checking, by the data processing module, for outlier data points; and
creating, by the data processing module, a curve using a curve-fitting methodology comprising one or more of a least squares best fit to a third polynomial order and a robust regression.

28. The method of claim 26, further comprising:
deriving, by the data processing module, the specified values by extrapolating data points at each period of time represented by the one or more groups from among the first bank yield curve and the second bank yield curve.

29. The method of claim 16, wherein the one or more groups comprise one or more tenor groups representing, at least, a one month period, a three month period, and a six month period.

30. The method of claim 16, wherein said adjusting further comprises normalizing the sorted eligible data responsive to one or more of: a bond issuer representing more than a threshold percentage of bond transactions, changes in market data, and conversions between different price/yield quotation conventions.

\* \* \* \* \*